(12) United States Patent
Fukuoka et al.

(10) Patent No.: US 8,304,020 B2
(45) Date of Patent: Nov. 6, 2012

(54) ADHESION PROMOTING PROCESS, ADHESION PROMOTING DEVICE, COATING AND DEVELOPING SYSTEM AND STORAGE MEDIUM

(75) Inventors: Tetsuo Fukuoka, Koshi (JP); Takahiro Kitano, Koshi (JP)

(73) Assignee: Tokyo Electron Limited, Tokyo-To (JP)

( * ) Notice: Subject to any disclaimer, the term of this patent is extended or adjusted under 35 U.S.C. 154(b) by 682 days.

(21) Appl. No.: 12/364,729

(22) Filed: Feb. 3, 2009

(65) Prior Publication Data

US 2009/0207390 A1 Aug. 20, 2009

(30) Foreign Application Priority Data

Feb. 15, 2008 (JP) ................................. 2008-035098

(51) Int. Cl.
*C23C 16/00* (2006.01)
*B05D 5/10* (2006.01)
*B05D 3/00* (2006.01)
(52) U.S. Cl. .................. 427/248.1; 427/299; 427/207.1
(58) Field of Classification Search .................. 427/299, 427/207.1, 248.1
See application file for complete search history.

(56) References Cited

U.S. PATENT DOCUMENTS

| 5,401,316 A * | 3/1995 | Shiraishi et al. ............. 118/689 |
| 2001/0015171 A1 * | 8/2001 | Ooshima ........................ 118/58 |

FOREIGN PATENT DOCUMENTS

JP 7-235084 9/1995

* cited by examiner

*Primary Examiner* — Kelly M Gambetta
(74) *Attorney, Agent, or Firm* — Oblon, Spivak, McClelland, Maier & Neustadt, L.L.P.

(57) ABSTRACT

There are provided an adhesion promoting process using a comparatively small amount of an adhesion promoting gas for processing a workpiece, an adhesion promoting device for carrying out the adhesion promoting process, a coating and developing system including the adhesion promoting device, and a storage medium storing a program specifying a set of instructions for carrying out the adhesion promoting process.

The adhesion promoting process includes the steps of: placing a workpiece on a support table disposed in a processing space defined by a processing vessel; adjusting the temperature of the workpiece placed on the support table to a first temperature at which an adhesion promoting gas does not condense on the workpiece in dew drops; supplying the adhesion promoting gas to the temperature-controlled workpiece to make a surface of the workpiece hydrophobic through the interaction of molecules contained in the adhesion promoting gas and the surface of the workpiece; and adjusting the temperature of the workpiece to a second temperature higher than the first temperature to supply thermal energy to excessive molecules remaining on the surface of the workpiece and evacuating the processing space to remove the excessive molecules from the surface of the workpiece.

6 Claims, 19 Drawing Sheets

ADHESION PROMOTING PROCESS, ADHESION PROMOTING DEVICE, COATING AND DEVELOPING SYSTEM AND STORAGE MEDIUM

BACKGROUND OF THE INVENTION

1. Field of the Invention

The present invention relates to an adhesion promoting process for promoting the adhesion of a surface of a substrate, such as a semiconductor wafer or a substrate for forming a LCD, an adhesion promoting device for carrying out the adhesion promoting process, a coating and developing system including the adhesion promoting device, and a storage medium storing a program specifying the steps of the adhesion promoting process.

2. Description of the Related Art

A series of steps of some resist pattern forming process included in a semiconductor device or a LCD substrate fabricating process includes a step of subjecting a substrate, such as a semiconductor wafer (hereinafter, referred to as "wafer") to an adhesion promoting process. A wafer is processed by the adhesion promoting process to promote the adhesion of a resist film to a base film before coating the wafer with a resist. The adhesion promoting process blows, for example, HMDS (hexamethyldisilazane) vapor against a surface of a wafer for adhesion promotion.

Referring to FIGS. 16A and 16B showing the change of the surface of a wafer W when HMDS gas is blown against the surface of the wafer W, chemical interaction of HMDS molecules and hydroxyl groups on the surface of the wafer W takes place and the hydroxyl groups are replaced with trimethylsilanol groups to make the surface of the wafer W hydrophobic.

In some cases, an immersion exposure is used for forming a resist pattern having lines of a very small width. An immersion exposure process will be briefly described. Operations for forming a transparent liquid film 12 of, for example, pure water between an exposure lens 11 included in an exposure device 1 and a wafer W as shown in FIG. 17A, transversely moving the exposure device 1 to a position corresponding to the next transfer area (shot area) 11A, and exposing the wafer W to light are repeated to transfer a predetermined circuit pattern to a resist film 14. In FIG. 17A, indicated at 13A and 13B are a liquid supply passage and a drainage passage, respectively. The transfer areas 11A are exaggerated. In the immersion exposure process, a resist film 14 formed on the surface of the wafer W is liable to come off because the surface of the wafer W is affected by the liquid flow for forming the liquid film 12. A part of the resist film 14 formed in a beveled peripheral surface of the wafer W is particularly liable to come off. Such peeling of the resist film 14 can be effectively prevented by the adhesion promoting process.

An adhesion promoting device using HMDS includes, for example, a processing vessel defining a processing space and internally provided with a support table for supporting a substrate thereon, a storage tank containing HMDS and connected by a gas supply line to the processing vessel, and an evacuating system for evacuating the processing space. The temperature of the support table can be optionally adjusted to a desired temperature to heat a wafer W. For example, $N_2$ (nitrogen gas) is supplied to the storage tank to vaporize liquid HMDS contained in the storage tank to produce HMDS gas. Nitrogen gas ($N_2$) serves as a carrier gas for carrying HMDS gas through the gas supply line into a space above a central part of the wafer W. Nitrogen gas ($N_2$) can be made to flow together with HMDS gas toward the wafer W or can be made to flow alone toward the wafer W.

An adhesion promoting process to be carried out by the adhesion promoting device will be described with reference to FIGS. 18 and 19. FIG. 18 is a graph showing the variation of the temperatures of the support table and the variation of the temperature of the wafer W by continuous lines and dotted lines, respectively. FIG. 19 shows the change of the surface of the wafer W caused by HMDS molecules 17 carried to the wafer W by $N_2$ flow indicated by thick arrows. Actually, a reaction product is produced by the interaction of HMDS molecules 17 and hydroxyl groups on the wafer W as mentioned above and the reaction product makes the surface of the wafer W hydrophobic. In FIG. 19, the reaction product is represented by the HMDS molecules 17 for convenience.

A wafer W is placed on the support table 18 heated at a temperature between 90° C. and 110° C. at time r1 (FIG. 18) to heat the wafer W from 23° C. corresponding to the temperature of a cleanroom in which, for example, a coating and developing system is installed, to a temperature substantially equal to the temperature of the support table in step Q1 (FIG. 19A). A mixed gas containing $N_2$ and HMDS gas is supplied to a central part of the wafer W and is discharged through a peripheral part of the wafer W so that the mixed gas flows over the entire surface of the wafer W. Consequently, HMDS molecules and hydroxyl groups on the wafer W interact to make the surface of the wafer W hydrophobic. HMDS molecules 17 are attracted to HMDS molecules 17 adhering to the surface of the wafer W by intermolecular force and a molecular layer 19 containing HMDS molecules 17 is formed on the surface of the wafer W as shown in FIG. 19B in step Q2. When the molecular layer 19 is heated, the bond of HMDS molecules 17 forming the molecular layer 19 is weakened by thermal energy. Consequently, some other HMDS molecules 17 are adsorbed by the molecular layer 19, while some of HMDS molecules 17 forming the molecular layer 19 separate from the molecular layer 19.

At time r2, the supply of the mixed gas containing $N_2$ and HMDS gas is stopped and the supply of only $N_2$ is started. Then, $N_2$ flows, similarly to the mixed gas, from a central part toward the circumference of the wafer W. The separation of HMDS molecules 17 from the molecular layer 19, to which HMDS molecules 17 are not supplied anymore, occurs progressively and HMDS molecules 17 separated from the molecular layer 19 are discharged together with $N_2$. Consequently, HMDS molecules 17 in the molecular layer 19 excluding those reacted with the hydroxyl groups in only one lower layer of the molecular layer 19 are removed from the surface of the wafer W as shown in FIG. 19C in step Q3. Consequently, A molecular layer 1A containing HMDS molecules 17 arranged in a single layer is formed as shown in FIG. 19D in step Q4. At time r3, the wafer W is transferred from the support table to a carrying device. A cooling mechanism included in the carrying device cools the wafer W. A time between the times r1 and r2 and a time between the times r2 and r3 are, for example, 30 s and 10 s, respectively. HMDS molecules 17 not reacted with hydroxyl groups and adhering to the wafer W are removed because the free HMDS molecules 17 react with water and reduce the hydrophobic property of the wafer W and to suppress the amine generation of HMDS molecules 17.

Since the resist film is liable to come off the beveled part of the wafer W, the adhesion promoting process needs to spread HMDS gas satisfactorily over the entire surface of the wafer W including the beveled part. Since the wafer W is heated when the mixed gas containing $N_2$ and HMDS gas is supplied to the wafer W to process the wafer W, ascending air currents ascending from the wafer W are produced as indicated by the arrows in FIGS. 19A, 19B, 19C, and 19D. Therefore, the mixed gas needs to be supplied against the ascending air currents. Process gas, such as HMDS gas, tends to flow from a position at a high temperature toward a position at a low temperature. therefore, HMDS molecules 17 are not distributed satisfactorily over the surface of the wafer W heated at the foregoing temperature and hence it is difficult for HMDS molecules 17 to react satisfactorily with the hydroxyl groups on the wafer W. Thus, a large amount of the mixed gas containing $N_2$ and HMDS gas needs to be supplied to process the entire surface including the beveled part of the wafer W uniformly by the adhesion promoting process.

As shown in FIG. 16, the interaction of HMDS molecules 17 and hydroxyl groups on the wafer W produces amine. Similarly, the interaction of HMDS molecules 17 and moisture contained in a processing atmosphere produces amine. Therefore, a large amount of amine is evolved if HMDS gas is supplied at high rates. When a large amount of amine is evolved, amine leaks from the processing vessel into, for example a coating and developing system and it is possible that the leaked amine acts on a resist film formed on a wafer W being carried in the coating and developing system, and deteriorates the quality of the resist to cause defective development. Studies are made to provide an adhesion promoting device using a processing vessel that defines an unsealed processing space into which HMDS gas is supplied to reduce the component parts of the processing vessel, to simplify the construction of the processing vessel and to reduce work for assembling and adjusting the adhesion promoting device. However, it is possible that the use of such a processing vessel defining an unsealed space increases amine leakage. Moreover, the supply of HMDS gas at a high rate increases the cost of the adhesion promoting process.

A technique mentioned in JP-A H7-235084, Paragraph 0026 applies an adhesive to a substrate before coating a surface of the substrate with a resist film. this technique mentions nothing about heating the substrate after that and cannot solve the foregoing problems.

SUMMARY OF THE INVENTION

The present invention has been made in view of the foregoing problems and it is therefore an object of the present invention to provide an adhesion promoting process capable of promoting the adhesion of a workpiece using an adhesion promoting gas supplied at a low supply rate, an adhesion promoting device for carrying out the adhesion promoting process, a coating and developing system including the adhesion promoting device, and a storage medium storing a program specifying the steps of the adhesion promoting process.

The present invention provides an adhesion promoting process including the steps of: placing a workpiece on a support table disposed in a processing space defined by a processing vessel; adjusting the temperature of the workpiece placed on the support table to a first temperature at which an adhesion promoting gas does not condense on the workpiece in dew drops; supplying an adhesion promoting gas to the temperature-controlled workpiece to make a surface of the workpiece hydrophobic through the interaction of molecules contained in the adhesion promoting gas and the surface of the workpiece; and adjusting the temperature of the workpiece to a second temperature higher than the first temperature to supply thermal energy to excessive molecules remaining on the surface of the workpiece and evacuating the processing space to remove the excessive molecules from the surface of the workpiece.

For example, the adhesion promoting gas is hexamethyidisilazane gas, the first temperature is in the range of 10° C. to 30° C., and the second temperature is 85° C. or above. The excessive molecules may be removed from the surface of the workpiece by adjusting the temperature of the workpiece and supplying a surface purging gas to the surface of the workpiece.

The present invention provides an adhesion promoting device including: a support table disposed in a processing space defined by a processing vessel to support a workpiece thereon; a temperature regulating means for regulating the temperature of the workpiece placed on the support table; an adhesion promoting gas supply means for supplying an adhesion promoting gas into the processing vessel holding the workpiece to process the workpiece by an adhesion promoting process; an evacuating means for evacuating the processing space; and a controller for controlling operations of the temperature regulating means, the adhesion promoting gas supply means and the evacuating means; wherein the controller controls operations of the temperature regulating means, the adhesion promoting gas supply means and the evacuating means such that the workpiece placed on the support table is kept at a first temperature at which the adhesion promoting gas does not condense on the workpiece in dew drops, the substrate is heated at a second temperature higher than the first temperature and the processing space is evacuated after making the surface of the workpiece hydrophobic by supplying the adhesion promoting gas to the workpiece.

For example, the adhesion promoting device further includes a purging gas supply means for supplying a purging gas to the workpiece to purge the excessive process gas supplied to the workpiece, wherein the controller controls operations of the temperature regulating means for supplying thermal energy to the excessive molecules and the purging gas supply means for supplying the purging gas to the workpiece.

The present invention provides a coating and developing system for processing a substrate, including: a carrier block to which a carrier containing the substrate is delivered; a processing block including a an adhesion promoting unit for processing a surface of the substrate taken out of the carrier by the adhesion promoting process, a coating unit for forming a resist film on the surface processed by the adhesion promoting process of the substrate, and a developing unit for processing the substrate coated with the resist film and processed by an exposure process by a developing process; an interface block for transferring the substrate coated with the resist film between the processing block and an exposure system. The exposure system carries out an immersion exposure process that forms a liquid film on the surface of the substrate and exposes the resist film to light through the liquid film.

The present invention provides a storage medium storing a computer program to be executed by an adhesion promoting device that heats a workpiece. The computer program specifies a set of instructions for carrying out the foregoing adhesion promoting process.

The present invention adjusts the temperature of the workpiece to the first temperature at which the adhesion promoting gas does not condense in dew drops, supplies the adhesion promoting gas, adjusts the temperature of the workpiece to the second temperature higher than the first temperature to remove the excessive molecules of the adhesion promoting gas from the surface of the workpiece by supplying thermal energy to the excessive molecules remaining on the surface of the workpiece. As will be obvious from the results of evaluation tests, which will be described later, the amount of the adhesion promoting gas needed by the adhesion promoting process of the present invention is smaller than that needed by the conventional adhesion promoting process.

DESCRIPTION OF THE PREFERRED EMBODIMENTS

Figure 1:
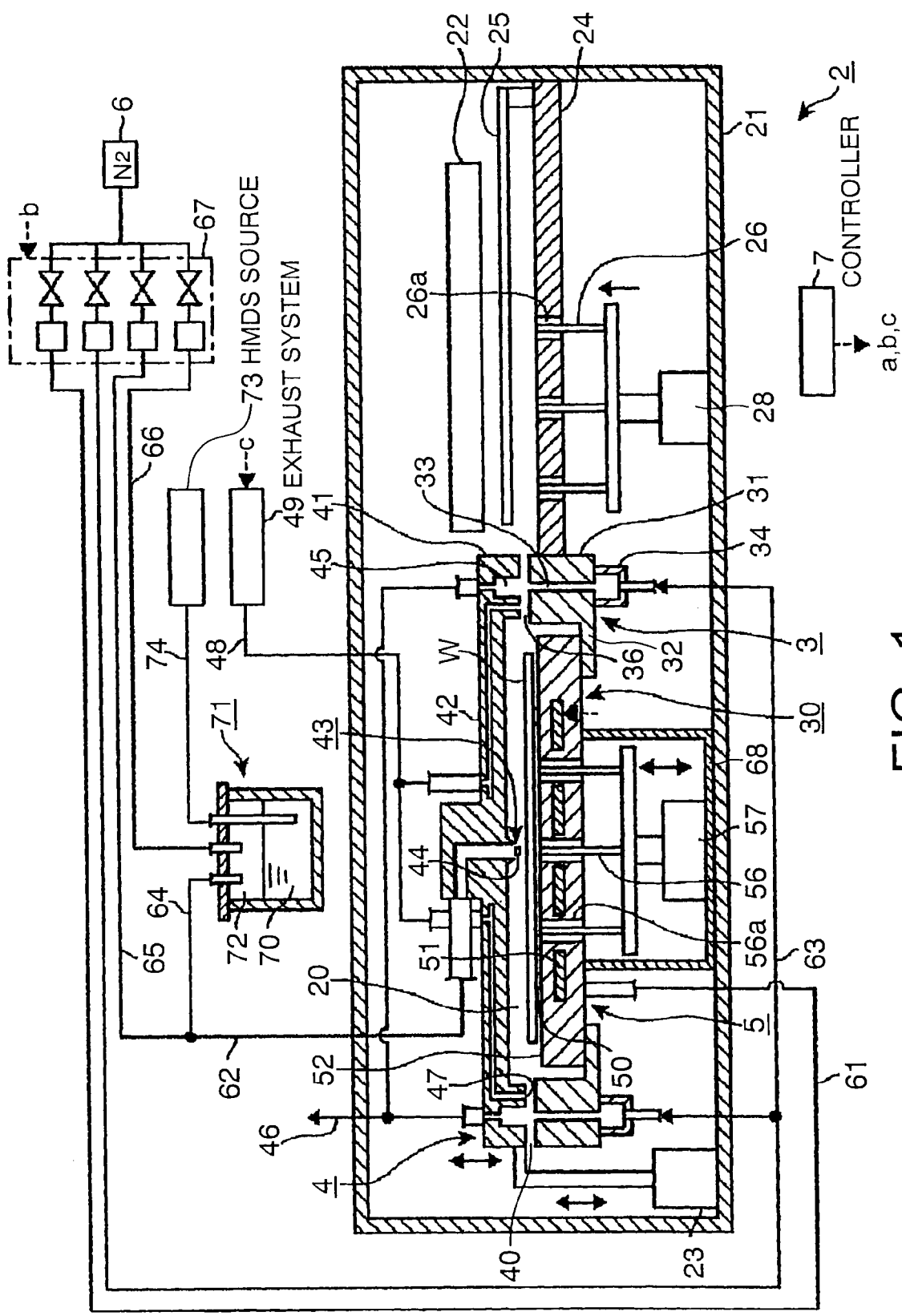
FIG. 1 is a longitudinal sectional view of an adhesion promoting device in a preferred embodiment according to the present invention for carrying out an adhesion promoting process embodying the present invention.

An adhesion promoting device 2 in a preferred embodiment according to the present invention will be described with reference to FIGS. 1 and 2. The adhesion promoting device 2 processes a workpiece, such as a wafer W of silicon dioxide, by an adhesion promoting process. The adhesion promoting device 2 has a flat, cylindrical processing vessel 30 including a vessel body 3 having an open upper end and placed in a box 21 provided with inlet/outlet openings 22 in its side walls, respectively, and a cover 4 covering the open upper end of the vessel body 3.

The vessel body 3 has a side wall 31 and a bottom wall surrounded by the side wall 31. A support table 5 for supporting a wafer W thereon is placed on the bottom wall 32 in the processing vessel 30. The support table 5 is internally provided with a heater 51, namely, a temperature regulating means. the heater 51 heats the support table 5 at an optional temperature according to control signal provided by a controller 7 to heat a wafer W placed on the support table 5 at a temperature equal to that of the support table 5. The support table 5 may be internally provided with a cooling mechanism, not shown, for passing a coolant or a cooling gas through the support table 5 to cool the support table 5 rapidly.

A wafer W is placed on the surface 52 of the support table 5 with its back surface facing the surface 52 of the support table 5. The wafer W is supported in a horizontal position on pins 50 such that a narrow gap is formed between the wafer W and the surface 52 of the support table 5. The height of the upper ends of the pins 50 from the surface 52 is, for example, 0.1 mm. Many gas discharge openings 53 are formed in the surface 52. Nitrogen gas ($N_2$), namely, a purging gas, is jetted through the gas discharge openings 53 against the back surface of the wafer W to suppress the back surface from being processed by an adhesion promoting process by HMDS gas that flows along the back surface of the wafer W. The adhesion promotion of the back surface is thus suppressed to suppress the scattering of HMDS molecules adhered to the back surface of the wafer W. To make the function of the gas discharge openings 53 effective, the gas discharge openings 53 are arranged circumferentially at equal angular intervals so that the number of the gas discharge openings 53 in an area farther from the center of the support table 5 is greater than that of the gas discharge openings 53 in an area nearer to the center of the support table 5 to jet $N_2$ uniformly against the back surface of the wafer W. The diameter of the gas discharge openings 53 is, for example, 1.0 mm.

Figure 2:
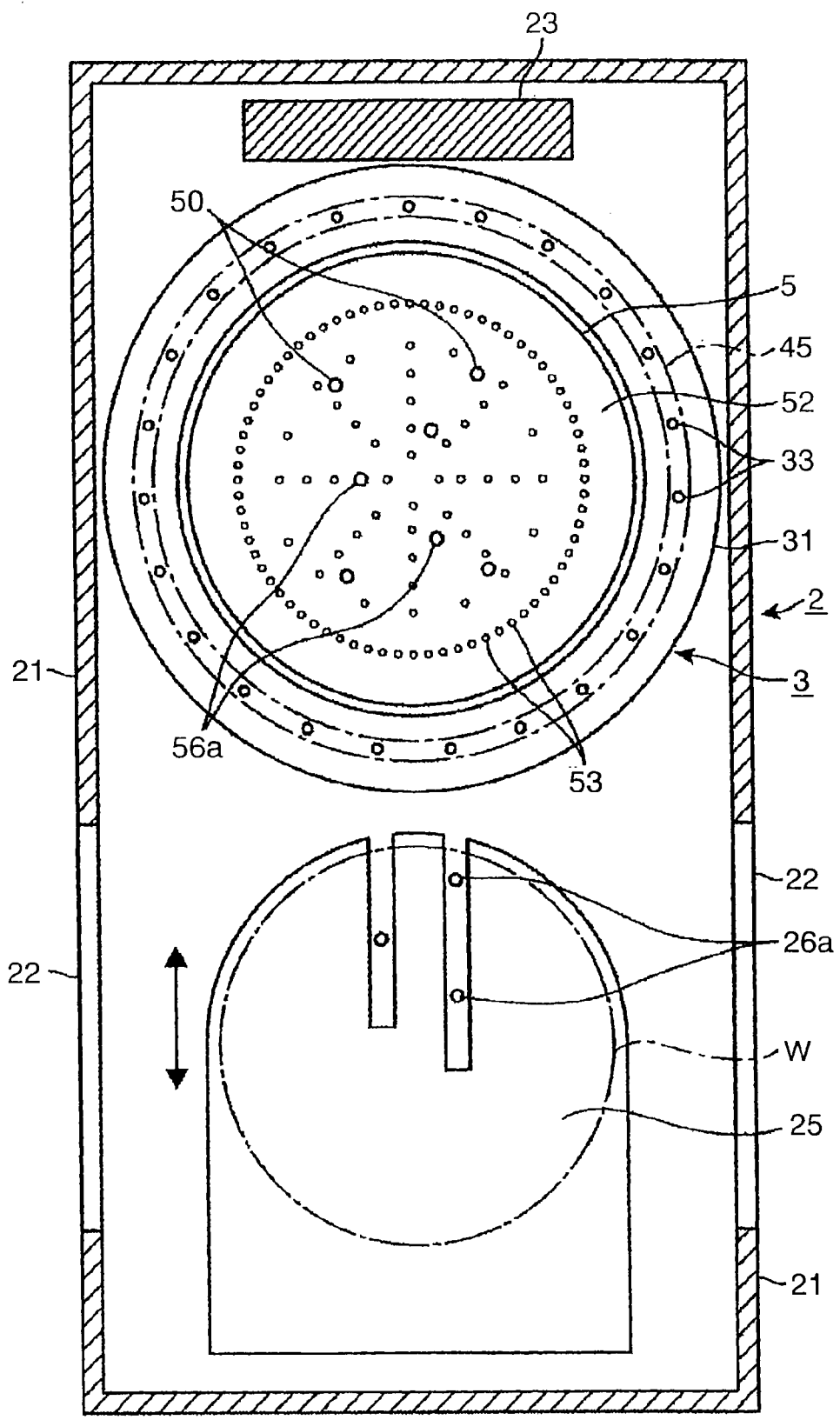
FIG. 2 is a cross-sectional view of the adhesion promoting device shown in FIG. 1.

The gas discharge openings 53 connects with a gas passage 54 (FIG. 3), not shown in FIG. 1. The gas passage 54 is connected to a gas source 6 storing $N_2$ by a gas supply line 61. Indicated at 56 in FIG. 2 are three lifting pins for transferring a wafer W between a cooling plate 25 and the support table 5. The pins 56 are axially movably fitted in holes 56a and are moved vertically by a pin-lifting mechanism 57. The lifting mechanism 57 is surrounded by a cover 58.

The cover 4 has a side wall 41 and a top wall 42 surrounded by the side wall 41. the cover 4 can be vertically moved by a cover-lifting mechanism 23 when a wafer W is carried into the processing vessel 30. The cover 4 covers the vessel body 3 such that the lower end of the side all 41 of the cover 4 is spaced apart from the upper end of the side wall 31 of the vessel body 3 by a gap 40 of, for example, a thickness between about 0.5 and about 2 mm to close the open upper end of the vessel body 3. Thus, a processing space 20 for an adhesion promoting process is formed between the vessel body 3 and the cover 4.

A process gas nozzle 43 is formed, for example, in a central part of the inside surface of the cover 4 to spout HMDS gas and $N_2$ from an upper central part of the processing space 20 onto a wafer W placed on the support table 5. The process gas nozzle 43 has a cylindrical shape tapering downward. A plurality of process gas discharge holes 44 are formed at intervals in the circumference of a lower part of the process gas nozzle 43 to spout HMDS gas and $N_2$ radially outward in the processing space 20. One end of a gas supply line 62 is connected to the cover 4 to spout the process gas through the process gas discharge holes 44.

An annular buffer chamber 45 concentric with the processing space 20 is formed in the side wall 41 of the cover 4. Gas supply ports 33 are formed in the side wall 31 of the vessel body 3 so as to open into the buffer chamber 45 to supply $N_2$ into the buffer chamber 45. Nitrogen gas ($N_2$) is stored temporarily in the buffer chamber 45. One end of a gas supply line 63 is connected to a gas supply chamber 34 formed in a lower part of the vessel body 3 so as to extend along the circumference of the vessel body 3. The upstream end of the gas supply ports 33 are connected to the gas supply chamber 34.

The gas flowed into the buffer chamber 45 flows into an annular gas supply passage 36 of a thickness between about 1 and about 3 mm formed between a peripheral part of the vessel body 3 corresponding to an inner area of the buffer chamber 45 and a peripheral part of the cover 4 or flows through an exhaust pipe 46 connected to the buffer chamber 45 into the exhaust line of a factory in which the adhesion promoting device 2 is installed.

Exhaust ports 47 are formed in a circumferential arrangement in the side wall 41 of the cover 4 to evacuate the processing space 20 through a space surrounding a wafer W placed on the support table 5. The exhaust ports 47 are connected to an exhaust line 48. The exhaust line 48 is connected to an exhaust system 49 including a vacuum pump, not shown, provided with a pressure controller. Upon the reception of a control signal from the controller 7, the exhaust system 49 evacuates the processing space 20 at a predetermined exhaust rate.

A gas supply line 64 included in an adhesion promoting process gas supply system and a gas supply line 65 included in a purging gas supply system branch off from an upstream part of the gas supply line 62. The upstream end of the gas supply line 64 opens into a vapor-phase space 72 in a storage tank 71 storing liquid HMDS. The upstream end of the gas supply line 65 is connected to the gas source 6, namely, the $N_2$ source. A HMDS vaporizing gas supply line 66 has one end opening into the vapor-phase space 72 of the storage tank 71 and the other end connected to the $N_2$ source. Nitrogen gas ($N_2$) is supplied through the HMDS vaporization gas supply line 66 into the storage tank 71 to vaporize the liquid HMDS contained in the storage tank 71 to produce a HMDS gas. HMDS gas and $N_2$ used for vaporizing the liquid HMDS are supplied through the gas supply lines 64 and 62 into the processing space 20. Nitrogen gas ($N_2$) serves as a carrier gas for carrying HMDS gas. Indicated at 73 in FIG. 1 is a HMDS source for supplying HMDS into the storage tank 71. The HMDS source 73 is connected to the storage tank 71 by a liquid supply line 74.

Gas supply control devices 76 including valves and mass-flow controllers are placed in the gas supply lines 61, 63, 65 and 66 connected to the $N_2$ source 6. Flows of $N_2$ through the gas supply lines 61, 63, 65 are controlled individually by the gas supply control devices 76 on the basis of control signals provided by the controller 7. Thus, flow rates at which $N_2$ is supplied to the gas discharge openings 53, the buffer chamber 45 and the processing space 20 are controlled individually, and a flow rate at which HMDS gas flows into the processing space 20 is controlled.

Figure 3:
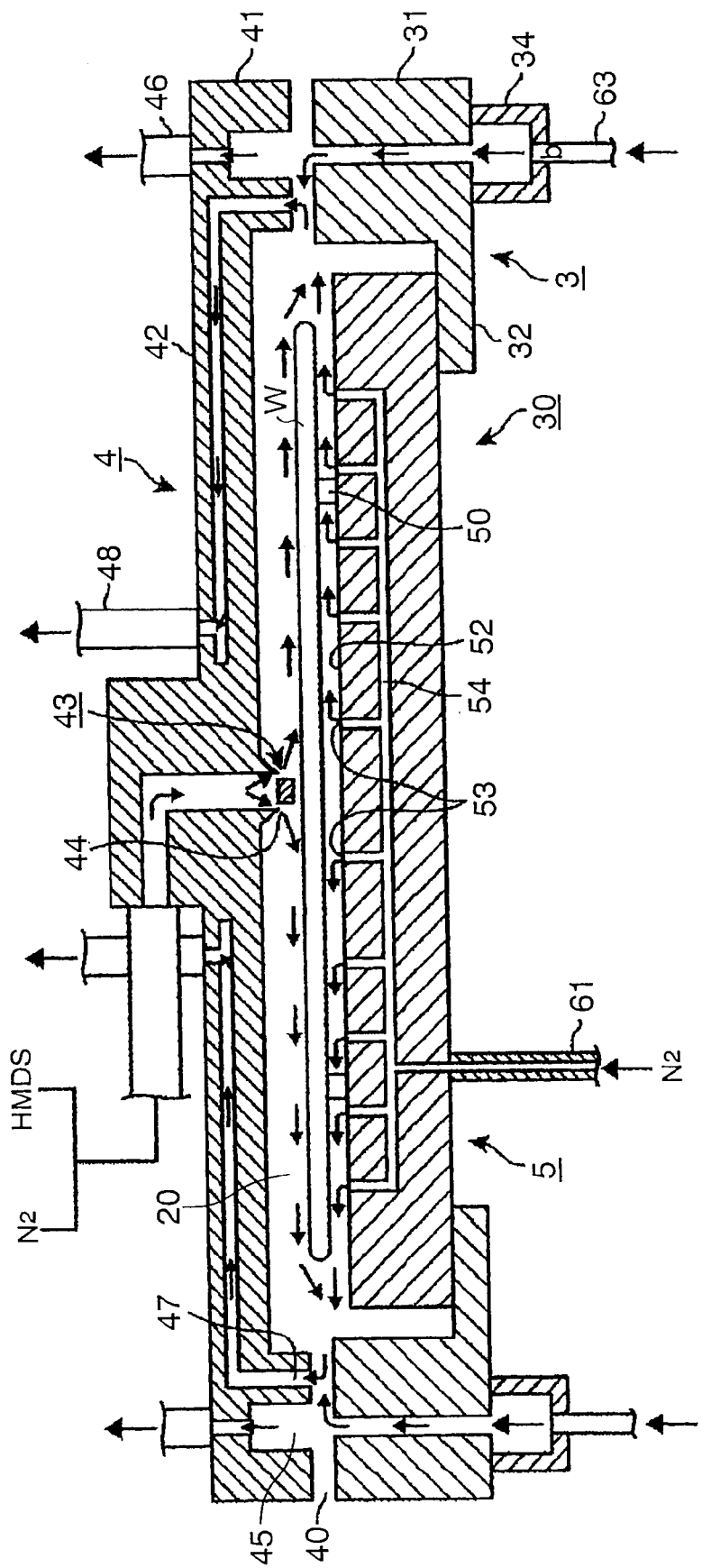
FIG. 3 is a schematic sectional view of assistance in explaining the flow of a gas in a processing vessel included in the adhesion promoting device shown in FIG. 1.

FIG. 3 shows flows of $N_2$ and HMDS gas, namely, the adhesion promoting process gas, in the processing chamber 30 when a mixed gas containing $N_2$ and HMDS gas is supplied into the processing vessel 30. Nitrogen gas ($N_2$) is supplied into the buffer chamber 45 at a predetermined flow rate and the processing space 20 is evacuated at a predetermined exhaust rate at a vacuum before supplying the mixed gas into the processing vessel 30 so that $N_2$ is exhausted from the buffer chamber 45 through the exhaust ports 47.

Then, the mixed gas is discharged through the process gas discharge holes 44 into the processing space 20 and, at the same time, $N_2$ is supplied through the gas supply line 61 at a flow rate of, for example, 0.2 L/min to discharge $N_2$ through the gas discharge openings 53 into a space under the lower surface of the wafer W. The mixed gas and $N_2$ discharged into the spaces over and under the wafer W are exhausted through the exhaust ports 47 formed around the wafer W. Thus, the mixed gas and $N_2$ diffuse radially outward from a central part of the wafer W toward the circumference of the wafer W and are exhausted through the exhaust ports 47. The flow of the mixed gas into the space under the wafer W is suppressed by $N_2$ currents produced under the wafer W. Thus, the upper surface of the wafer and a beveled part of the wafer W exposed to the HMDS gas contained in the mixed gas is made hydrophobic. Gas currents similar to those produced when the mixed gas is supplied into the processing vessel 30, are produced in the processing vessel 30 when only $N_2$, namely, a purging gas, is supplied through the process gas discharge holes 44 into the space over the upper surface of the wafer W. In this state, $N_2$ is not discharged through the gas discharge openings 53.

Indicated at 24 in FIG. 1 is a partition plate. A cooling plate 25 is movable between a front part provided with the inlet/outlet openings 22 and a rear part in which the processing vessel 30 is disposed. The cooling plate 25 is provided with a coolant passage, not shown, through which a coolant flows. The cooling plate 25 cools a wafer W received from the support table 5. Lifting pins 26 shown in FIG. 1 are used to transfer a wafer W between an external carrying mechanism, not shown, and the cooling plate 25. The lifting pins 26 are moved vertically in openings 26a formed in the partition plate 24 so as to be projected from and retracted below the upper surface of the cooling plate 25.

The adhesion promoting device 2 is controlled by the controller 7. The controller 7 is, for example, a computer provided with a storage device storing a program, memories and a CPU. The program is a set of instructions to be executed by the controller 7 to carry out steps of an adhesion promoting process. The controller 7 gives control signals to the component parts of the adhesion promoting device 2 to carry out the adhesion promoting process. The program is stored in a storage medium, such as a flexible disk, a compact disk, a hard disk or a magnetooptical disk (MO). The storage medium storing the program is installed in the controller 7.

Figure 4:
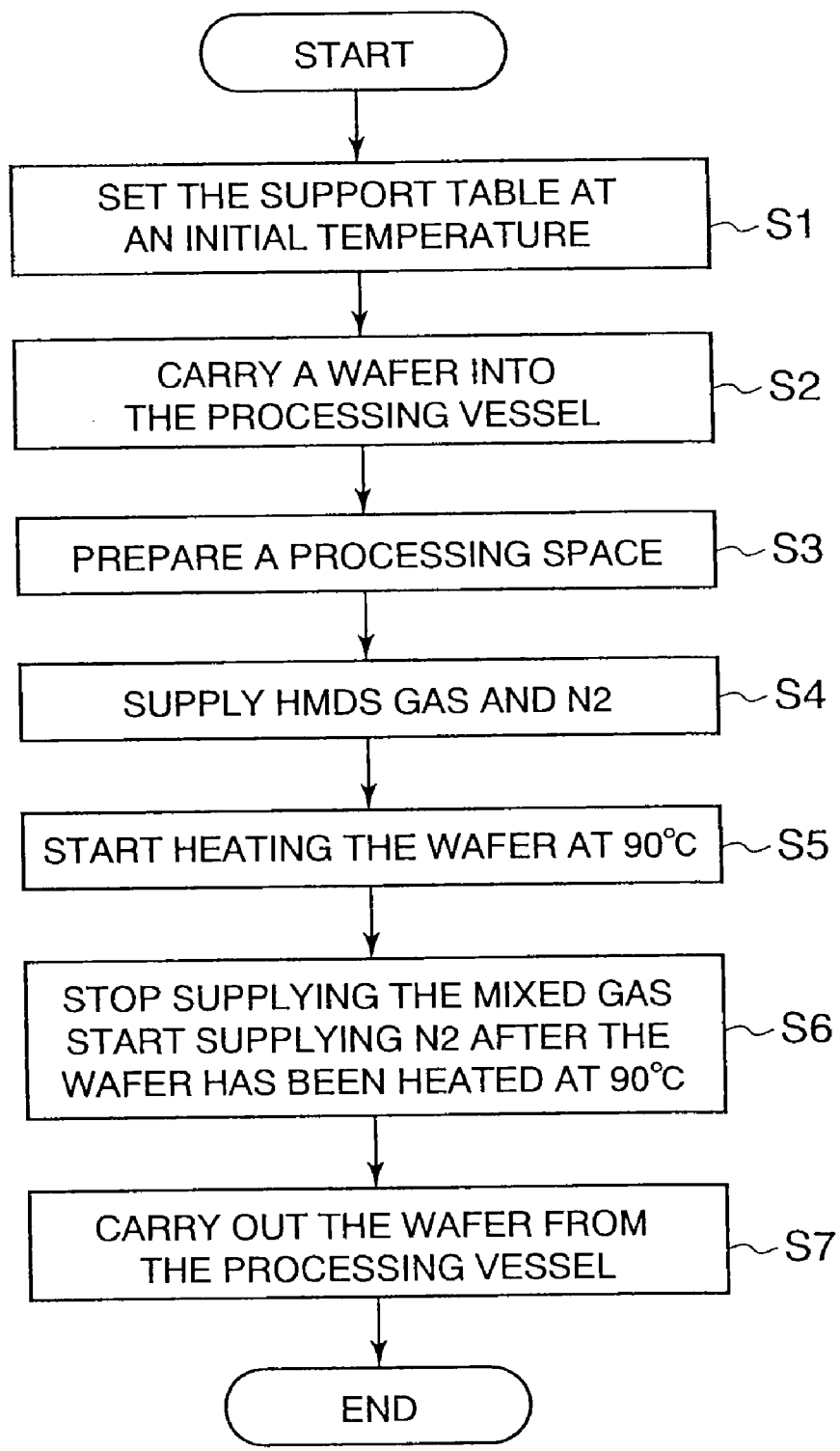
FIG. 4 is a flow chart showing steps of an adhesion promoting process to be carried out by the adhesion promoting device shown in FIG. 1.
Figure 5:
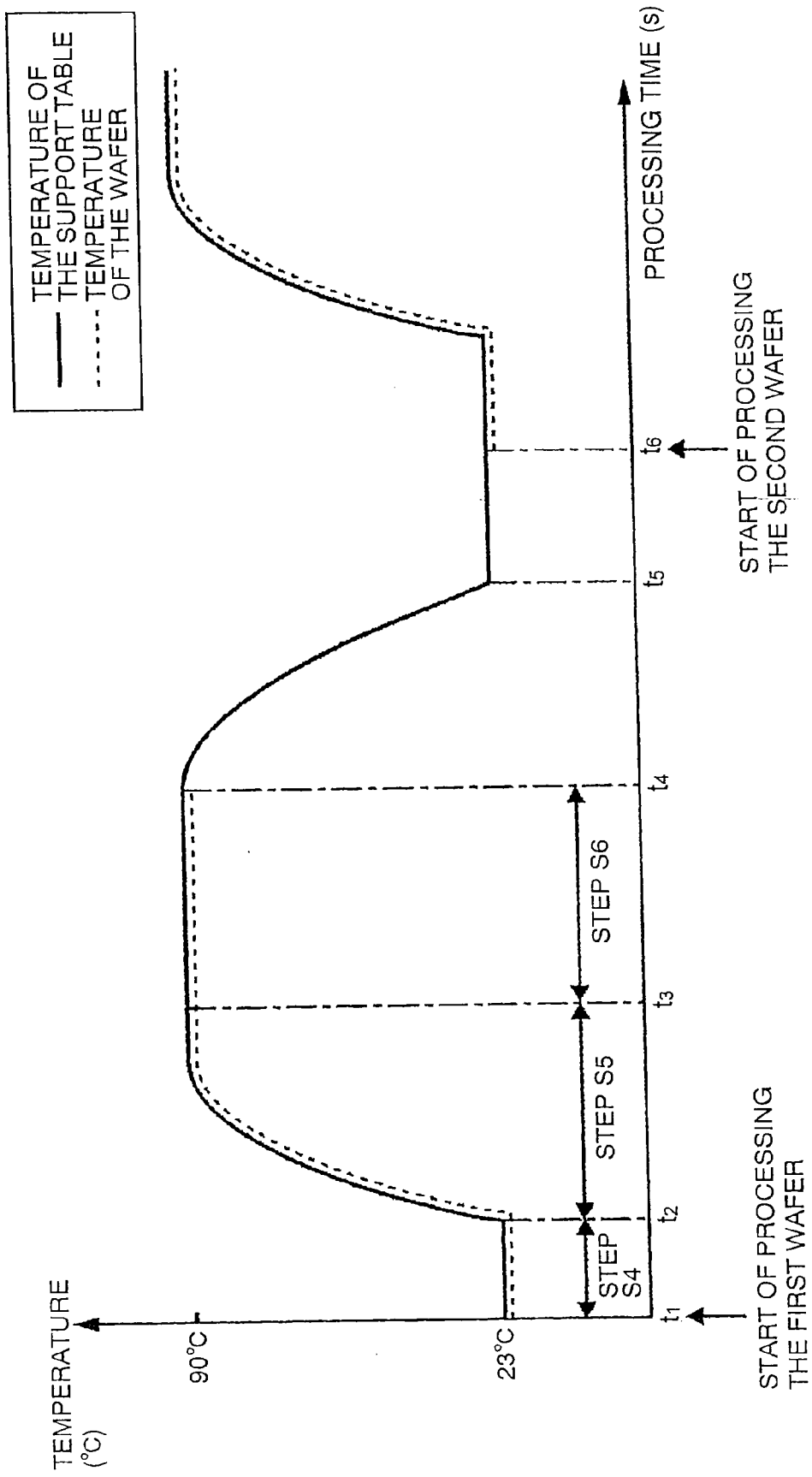
FIG. 5 is a graph showing the variation of the respective temperatures of a support table and a wafer during the adhesion promoting process of the present invention.

The adhesion promoting process to be carried out by the adhesion promoting device 2 will be described with reference to FIGS. 4, 5 and 6. FIG. 4 is a flow chart showing steps of the adhesion promoting process, FIG. 5 is a graph showing the variation of the temperatures of the support table 5 indicated by continuous line and the variation of the temperature of a wafer W indicated by dotted line during the adhesion promoting process and FIGS. 6A, 6B, 6C, 6D and 6E are views of assistance in explaining the condition of HMDS molecules 75 carried by $N_2$ flows 76 indicated by thick arrows 76. In FIG. 6, reaction products originating from HMDS molecules 75 are represented by HMDS molecules 75 as mentioned in the description of the related art.

The heater 51 heats the support table 5 at a first temperature of, for example, 23° C. suitable for causing the wafer W react with HMDS molecules (adsorb HMDS molecules) in step S1. A carrying mechanism, not shown, carries a wafer W into the box 21 of the adhesion promoting device 2. In step S2, the lifting pins 26 transfer the wafer W to the cooling plate 25, the cover 4 is raised, and the cooling plate 25 moves into the processing vessel 30. Then, the lifting pins 56 transfers the wafer W from the cooling plate 25 to the support table 5. In step S3, the cooling plate 25 is returned to its home position in the front part provided with the inlet/outlet openings 22.

The support table 5 keeps the wafer W at 23° C. Meanwhile, $N_2$ is supplied at a predetermined flow rate into the buffer chamber 45 and after a short delay, an atmosphere in the processing vessel is exhausted at a predetermined exhaust rate through the exhaust pores 47 to evacuate the processing space 20 and $N_2$ sucked from the buffer chamber 45 into the processing space 20 flows into the exhaust ports 47 in $N_2$ streams. The $N_2$ streams produced between the side wall 31 of the vessel body 3 and the side wall 41 of the cover 4 isolates the processing space 20 from the ambient space.

Referring to FIG. 5, the $N_2$ source 6 starts supplying $N_2$ at a predetermined flow rate into the HMDS storage tank 71 at time t1. Then, pressure in the storage tank 71 increases, the liquid HMDS evaporates and an amount of HMDS gas corresponding to that of $N_2$ supplied into the storage tank 71 is produced. A mixed gas containing HMDS gas and $N_2$ supplied into the storage tank 71 flows through the gas supply lines 64 and 62 onto a central part of the surface of the wafer W in step S4. Nitrogen gas ($N_2$) supplied through the gas supply line 61 is discharged through the gas discharge openings 53 against the lower surface of the wafer W substantially simultaneously with the supply of the mixed gas.

Figure 6A:
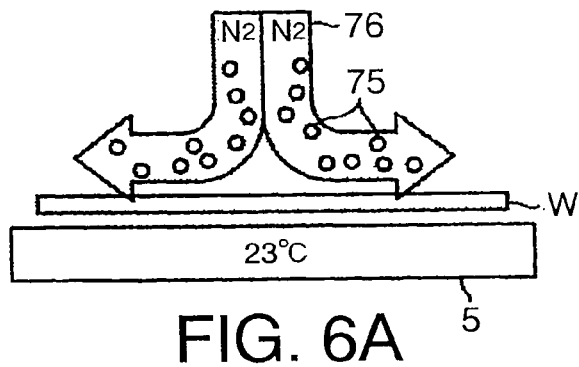
FIGS. 6A, 6B, 6C, 6D and 6E are views of assistance in explaining the condition of HMDS molecules in the steps of the adhesion promoting process.

Since the wafer W, meanwhile, is kept at that temperature, the production of ascending air currents from the wafer W, such as mentioned in connection with the description of the related art, is insignificant as compared with the production of ascending air current when the wafer W is heated at temperatures between about 90° C. and about 110° C. Therefore, HMDS molecules 75 can flow to the wafer W against the reduced resistance of ascending air currents and flows from a central part of the wafer W toward the peripheral part of the wafer W as shown in FIG. 6A.

Figure 6B:
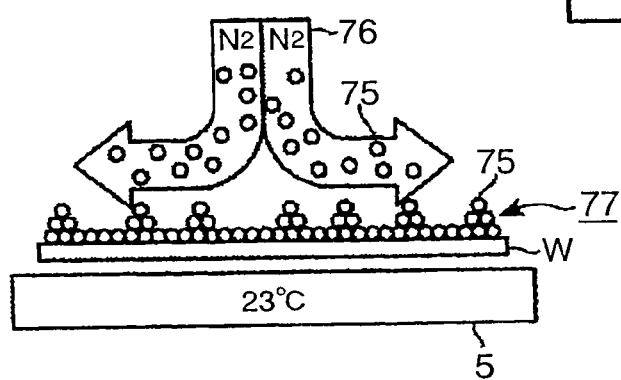
Figure 6C:
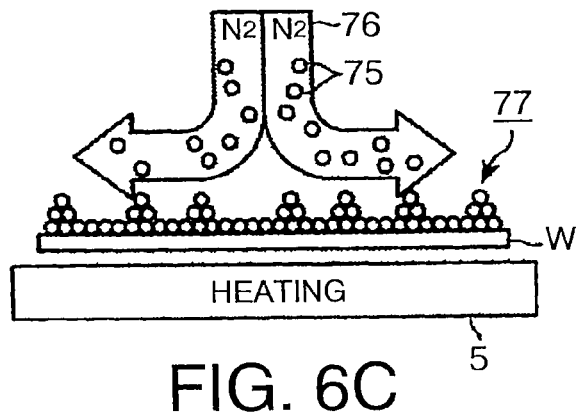

The HMDS molecules 75 flowing along the surface of the wafer W react with hydroxyl groups on the surface of the wafer W as mentioned in the description of the related art to make the entire surface including a central part and beveled part of the wafer W hydrophobic. HMDS molecules 75 are adsorbed by HMDS molecules reacted with the surface of the wafer W and a molecule layer 77 of stacked HMDS molecules 75 as shown in FIG. 6B is formed. As mentioned above, HMDS gas tends to flow toward a place of lower temperatures. Therefore, HMDS molecules 75 can more easily come into contact with the surface of the wafer W and interaction between HMDS molecules 75 and hydroxyl groups on the surface of the wafer W takes place more easily in a state where the wafer W is at the low temperature as compared with a state where the wafer W is at about 90° C.

Raising the temperature of the support table 5 is started at time t2 (FIGS. 5 and 6C) in step S5. The temperature of the support table rises to a second temperature of, for example 90° C. higher than the first temperature and the temperature of the wafer W rises to 90° C. following the temperature of the support table 5. While the temperature of the wafer W is being thus increased, thermal energy is supplied to the HMDS molecules 75 forming the molecular layer 77 and, consequently, intermolecular bond strength acting between the HMDS molecules 75 decreases. Since HMDS molecules 75 can easily react with the wafer W under this condition as mentioned above, The time for which HMDS gas is supplied with the wafer W kept at 23° C. may be a short time. For example, the time interval between the times t1 and t2 is 3 s.

Figure 6D:
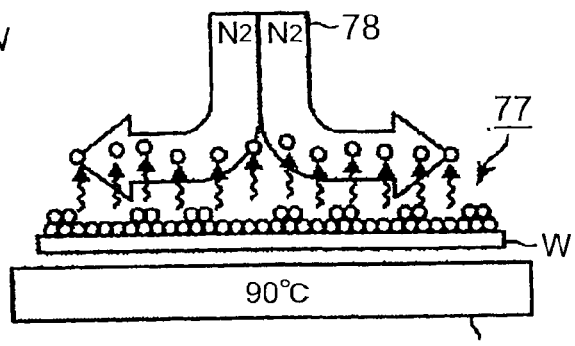
Figure 6E:
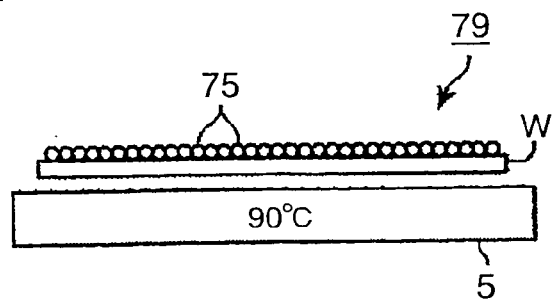

In step S6, the supply of the mixed gas containing HMDS gas and $N_2$ is stopped at time t3, and only $N_2$ as a surface purging gas is supplied through the gas supply line 65 and 62 to a central part of the wafer W at a flow rate between 3 and 4 L/min. Similarly to the mixed gas, $N_2$ is sucked into the exhaust ports 47. Thus, $N_2$ flows from a central part toward a peripheral part of the wafer W in currents 78. Since the intermolecular bond strength acting between the HMDS molecules 75 is weakened, the HMDS molecules 75 in the molecular layer 77 excluding those reacted with hydroxyl groups on the surface of the wafer W are separated from the surface of the wafer W and are carried away from the surface of the wafer W by the currents 78 of $N_2$ as shown in FIG. 6D. Since the intermolecular bond strength acting between HMDS molecules and hydroxyl groups on the surface of the wafer W is higher than that acting between HMDS molecules 75, only the HMDS molecules bonded directly to the wafer W remains in a single molecular layer 79 on the wafer W as shown in FIG. 6E. For example, the time interval between the times t2 and 53 is 10 s.

Referring to FIG. 5, discharge of $N_2$ through the process gas discharge holes 44 is stopped and power supplied to the heater 51 is reduced at time t4 to decrease the temperature of the support table 5. Subsequently, in step S7, the exhaust rate at which the gases are exhausted through the exhaust ports 47 is reduced, the cover 4 is raised, and the wafer W is transferred by the lifting pins 56 to the cooling plate 25. The wafer W cools because the heat of the wafer W is transferred to the cooling plate 25. The operations for carrying the wafer W into the adhesion promoting device 2 is reversed to carry away the wafer W from the adhesion promoting device 2 and to transfer the wafer W to the external carrying mechanism. The temperature of the support table 5 is adjusted to 23° C. When the support table 5 is provided with a cooling mechanism, a time interval between the time t4 and time t5 in which the temperature of the support table drops to 23° C. is, for example, 20 s.

Then, the next wafer W, similarly to the preceding wafer W, is carried into the adhesion promoting device 2 and is carried into the processing vessel by the same procedure. The $N_2$ source 6 starts supplying $N_2$ into the HMDS storage tank 71 at time t6 like it started supplying $N_2$ at time t1. Then, the wafer W is processed similarly to the preceding wafer W by the same steps S of the adhesion promoting process.

The adhesion promoting process supplies HMDS gas to the surface of the wafer W kept at 23° C., and then raises the temperature of the wafer W up to 90° C. to remove excessive HMDS molecules from the wafer W. Therefore, the production of ascending air currents rising from the wafer W is suppressed while HMDS gas is supplied. Since HMDS molecules can easily adhere to the surface of the wafer W at lower temperatures, the adhesion promoting process can spread the HMDS gas over the entire surface of the wafer W by supplying the HMDS gas at a low flow rate in a short time as compared with the adhesion promoting process that supplies the HMDS gas to the wafer W heated at about 90° C. Thus, the respective amounts of $N_2$, namely, the carrier gas, and the HMDS gas needed by the adhesion promoting process are small. Consequently, the pressure in the processing vessel 30 does not rise high and hence the leakage of the HMDS gas and amine originating from the HMDS gas from the processing vessel 30 into the ambient space can be suppressed. The processing vessel 30 is not a sealed vessel and has the gap 40 opened to the ambient space around the processing vessel 30 between the side walls defining the processing space 20. The reduction of the amount of the HMDS gas supplied is particularly effective in suppressing the leakage of the HMDS gas and amine from the processing vessel 30. When the adhesion promoting device 2 is applied to a coating and developing system, the reduction of the amount of the HMDS gas supplied is particularly effective in suppressing the influence of amine originating from HMDS to suppress the formation of defects in a resist pattern.

Since the respective amounts of the HMDS gas and $N_2$, namely, a carrier gas, to be used can be reduced, increase in the cost of the adhesion promoting process can be suppressed.

When the excessive HMDS molecules 75 are removed from the wafer W in step S5, $N_2$, namely, a surface purging gas, does not necessarily need to be supplied. However, it is preferable to use $N_2$ as a purging gas because excessive HMDS molecules 74 can be still more effectively when $N_2$ is used for purging.

Figure 7:
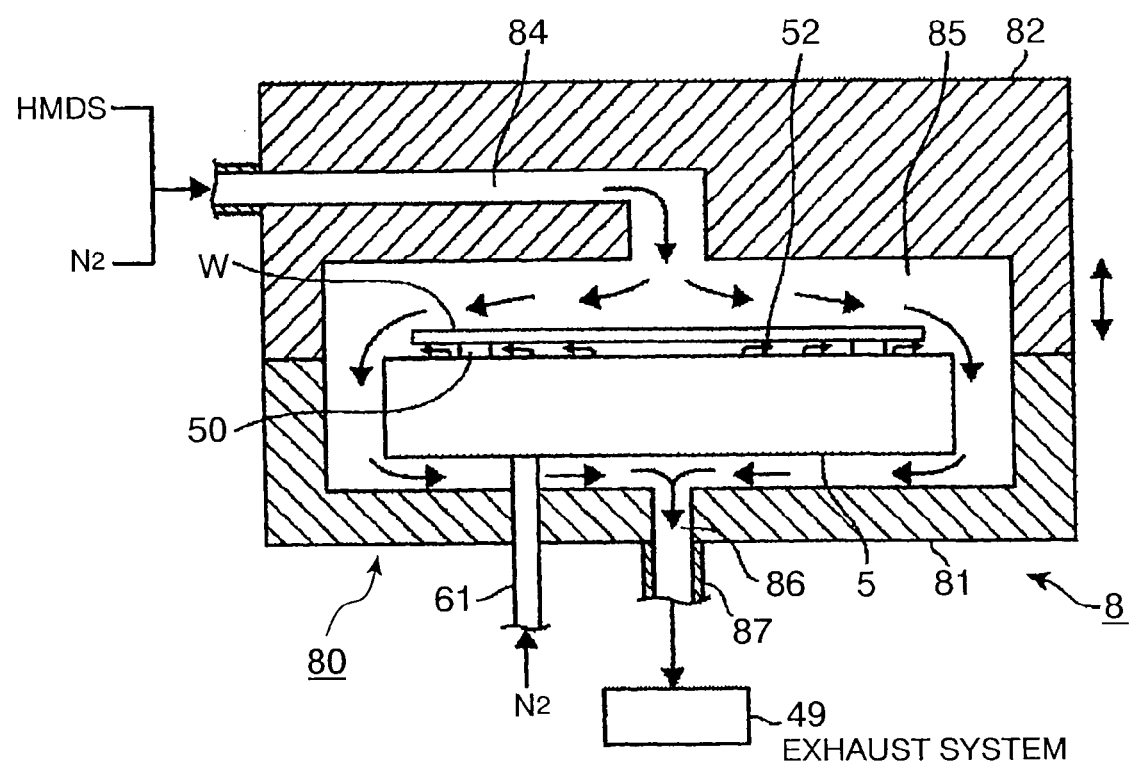
FIG. 7 is a longitudinal sectional view of an adhesion promoting device in another embodiment according to the present invention.

The adhesion promoting process can be executed by an adhesion promoting device 8 provided with a sealed processing vessel 80 having a vessel body 81 and a cover 82 closely joined to the vessel body 81. In the processing vessel 80, there is not gap between the vessel body 81 and the cover 82. The cover 82 is moved vertically relative to the vessel body 81. A piping system similar to that connected to the adhesion promoting device 2 is connected to the adhesion promoting device 8. A mixed gas containing HMDS gas and $N_2$ and $N_2$ can be individually supplied through a gas supply passage 84 into a processing space 85 defined by the processing vessel 80. Indicated at 86 in FIG. 7 is an exhaust port formed in a central part of the bottom wall of the vessel body 81 and at 86 is an exhaust pipe connected to the exhaust port 86. Operations of the adhesion promoting device 8 for supplying gases to a wafer W, evacuating the processing space 85 and heating a wafer W at a desired temperature by a support table 5 are controlled, similarly to those of the adhesion promoting device 2, by a controller 7.

The adhesion promoting device 8 may execute the series of steps S of the adhesion promoting process and may supply the gases into the processing space 85 in a state where the processing space 85 is at the normal pressure or may execute the series of steps S of the adhesion promoting process after reducing the pressure in the processing space 85 by the exhaust system 49. The HMDS gas does not necessarily need to be supplied into the processing vessel 80 by the method mentioned above that evaporates HMDS contained in the storage tank by supplying $N_2$ into the storage tank and carries the HMDS gas by $N_2$.

Figure 8:
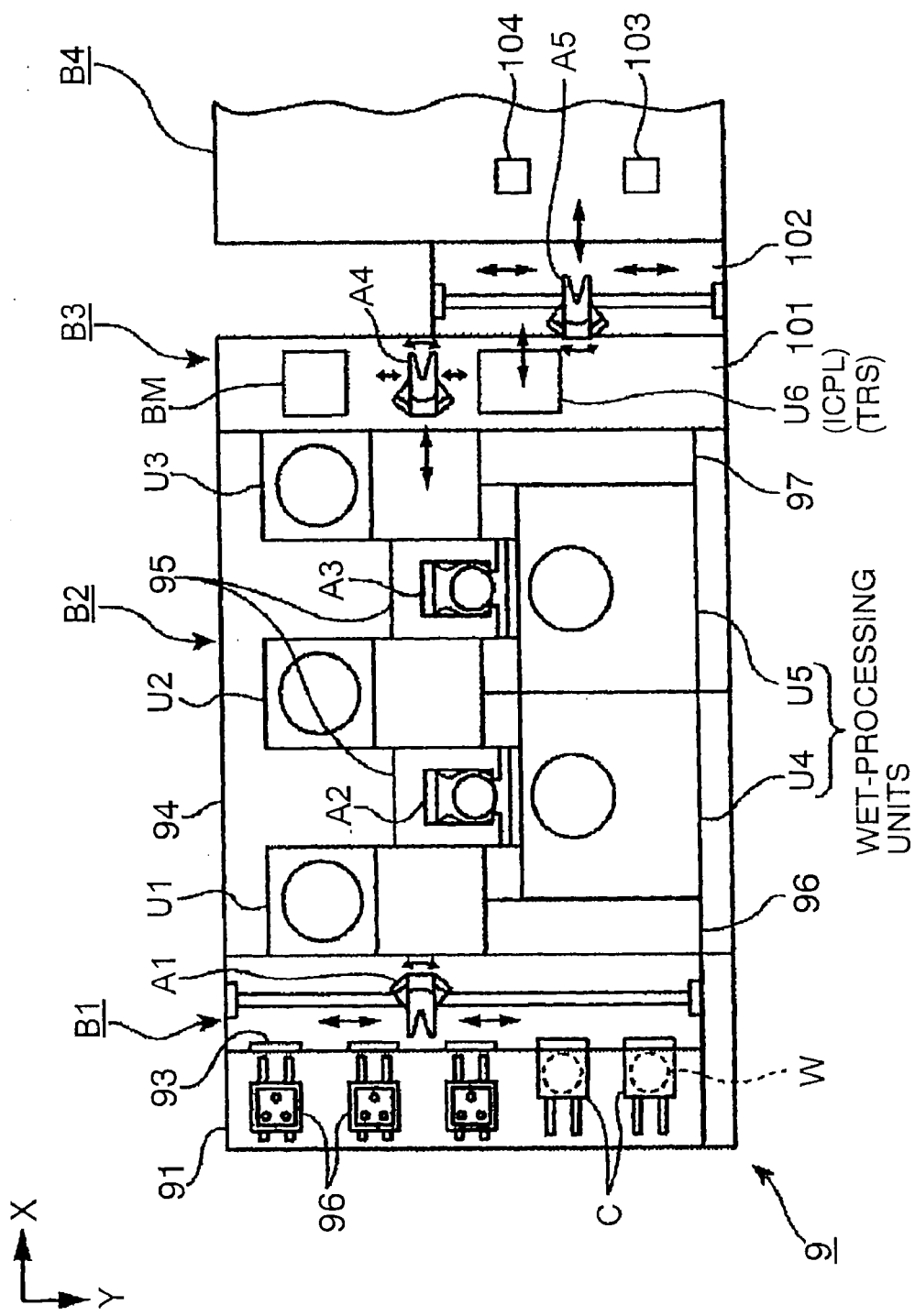
FIG. 8 is a plan view of a coating and developing system to which the adhesion promoting device of the present invention is applied.
Figure 9:
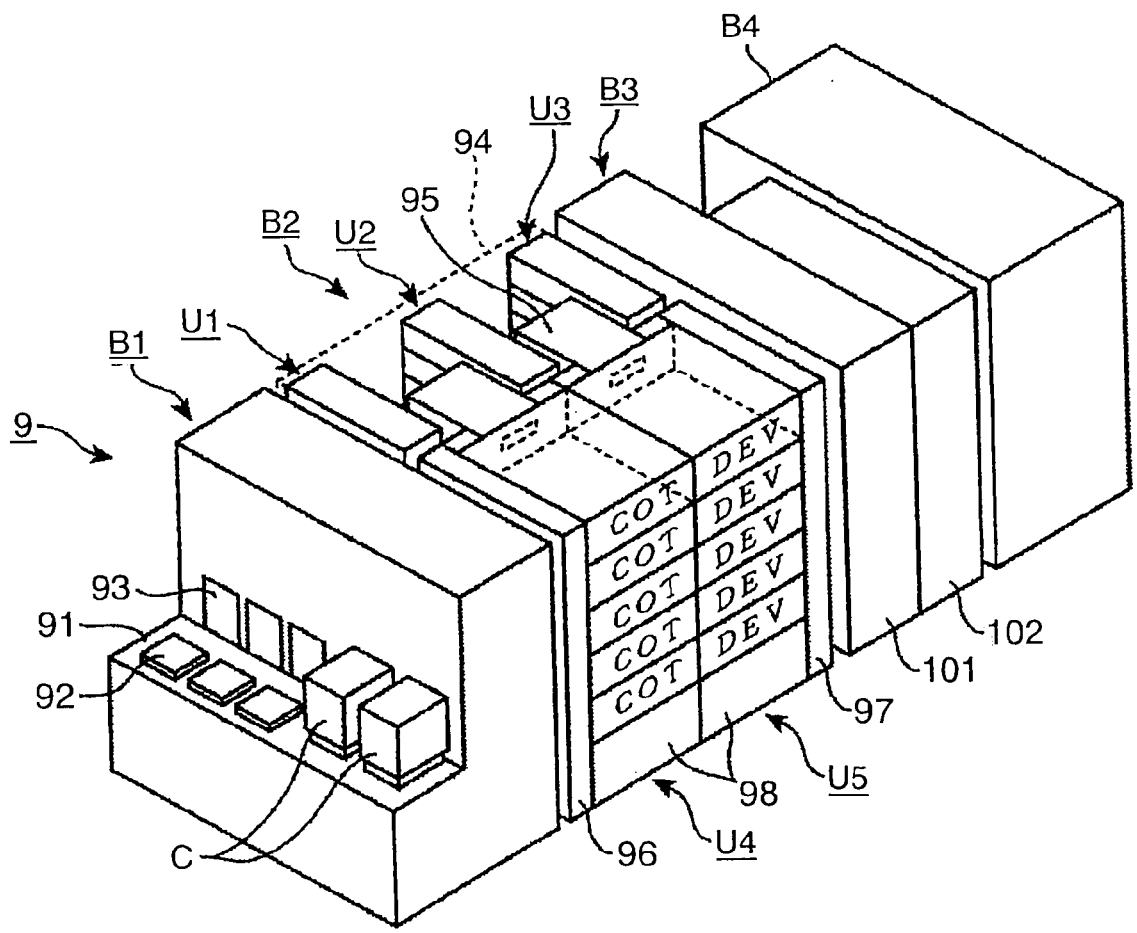
FIG. 9 is a perspective view of the coating and developing system shown in FIG. 8.
Figure 10:
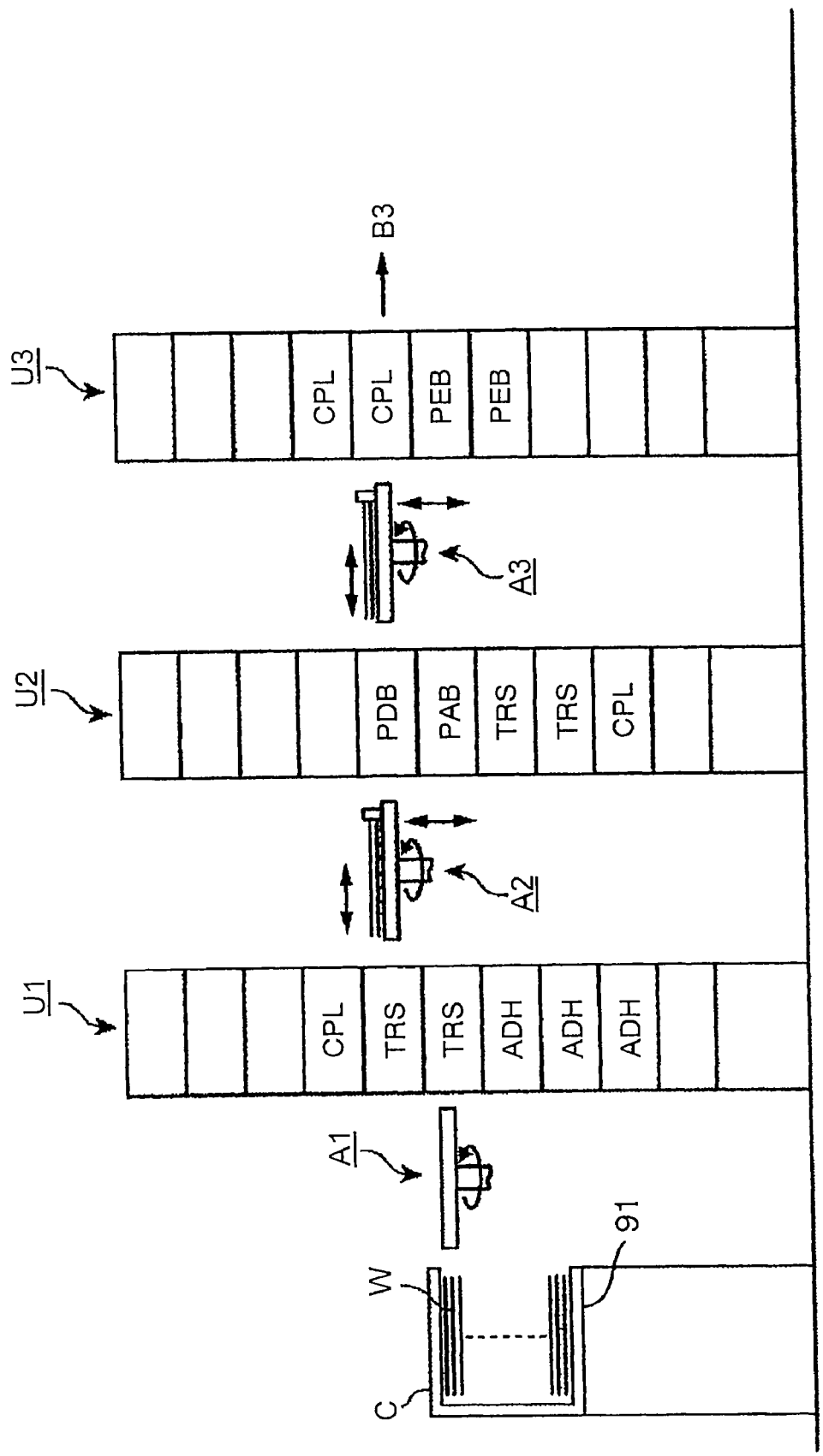
FIG. 10 is a schematic longitudinal sectional view of the coating and developing system shown in FIG. 8.
Figure 11:
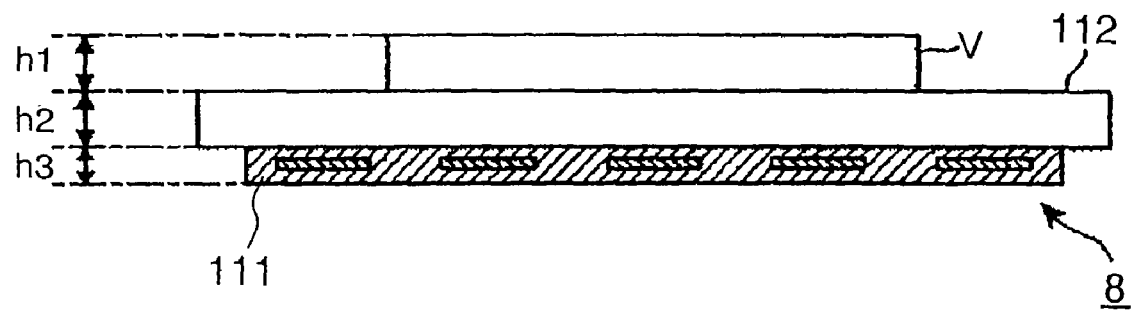
FIG. 11 is a side elevation of a wafer and a heater used for evaluation tests.

Application of the adhesion promoting device 2 or 8 to a coating and developing system will be described with reference to FIGS. 8 to 10. showing a coating and developing system 9 in a plan view, a perspective view and a longitudinal sectional view, respectively. Referring to FIGS. 8 to 10, a carrier block B1 receives and sends out a carrier C containing, for example, twenty-five wafers W. The carrier block B1 includes a carrier station 91 provided with a carrier table 92 capable supporting a plurality of carriers C thereon, covered openings 93 formed in a wall behind the carrier station 91 with respect to a wafer carrying direction, and a transfer device A1 for taking out a wafer W from the carrier C through the opening 93.

A processing block B2 surrounded by a box 94 is disposed behind and connected to the carrier block B1. In the processing block B2, shelf units U1, U2 and U3 formed by stacking up heating and cooling units in layers and main carrying devices A2 and A3 are arranged alternately. The main carrying devices A2 and A3 transfer a wafer from and to processing units including coating and developing units. The shelf units U1, U2 and U3 and the main carrying devices A2 and A3 are arranged in a longitudinal line. The shelf units U1, U2 and U3 have side walls provided with openings through which a wafer W is carried into and taken out from the heating and the cooling units. A wafer W can be optionally moved from the shelf unit U1 on the upstream side and the shelf unit U3 on the downstream side.

The main carrying device A2 is disposed in a space defined by the side walls of the shelf units U1 and U2, the left side wall, as viewed from the carrier block B1, of a wet-processing unit U4 on the right-hand side as viewed from the carrier block B1 and a back wall 95 on the left side of the main carrying device A2. The main carrying device A3 is disposed in a space defined by the side walls of the shelf units U2 and U3, the left side wall, as viewed from the carrier block B1, of a wet-processing unit U5 on the right side as viewed from the carrier block B1 and a back wall 95 on the left side of the main carrying device A3. Indicated at 96 and 97 are temperature-and-humidity regulating units each including a temperature regulating devices for regulating the temperatures of process solutions to be used by those units and air conditioning ducts.

As shown in FIG. 9, the wet-processing unit U4 is formed by stacking up a plurality of coating units COT, for example, five coating units COT, on a storage unit 98 defining a space to be used for supplying chemical solutions, such as a resist solution and a developer, and the wet-processing unit U5 is formed by stacking up a plurality of developing units DEV, for example, five developing units DEV, on a storage unit 98 defining a space to be used for supplying chemical solutions, such as a resist solution and a developer. Each of the shelf units U1, U2 and U3 is formed by stacking up a plurality of units for executing pretreatment processes to be executed before processes to be executed by the wet-processing units U4 and U5, and a plurality of units for executing posttreatment processes to be executed after processes to be executed by the wet-processing units U4 and U5, for example, in ten layers. Those units include heating units for heating (baking) a wafer W, cooling units CPL for cooling a wafer W at a predetermined temperature, and transfer stages TRS through which a wafer is transferred between the units. The heating units include heating units PAB for heating a wafer coated with a resist before an exposure process, heating units PEB for heating a wafer processed by an immersion exposure process before a developing process, and heating units PDB for heating a wafer processed by the developing process. Those heating units heat a wafer W at predetermined temperatures, respectively. The shelf unit U1 includes an adhesion promoting module ADH, namely, the adhesion promoting device 2 or 8.

An interface block B3 having a first carrying chamber 101 and a second carrying chamber 102 is disposed behind the shelf unit U3 of the processing block B2. The first carrying chamber 101 and the second carrying chamber 102 are provided with transfer devices A4 and A5, respectively. The transfer devices A4 and A5 transfer a wafer W between the processing block B2 and an exposure system B4. Installed in the first carrying chamber 101 are a shelf unit U6 formed by stacking up transfer modules TRS and precision temperature regulating modules ICPL, and a buffer module BM for temporarily holding a wafer W before the wafer W is delivered to the exposure system B4. The transfer device A4 can carry a wafer from and to the transfer stages and those modules.

The second transfer device A5 of the second carrying chamber 102 carries a wafer W to and from the transfer stages TRS of the first carrying chamber 101 and a receiving stage 103 and a delivery stage 104 included in the exposure system B4. The exposure system B4 processes a wafer W delivered to the receiving stage 103 by an immersion exposure process and places the wafer W processed by the immersion exposure process to the delivery stage 104.

A wafer carrying route in the coating and developing system 9 will be described. A carrier C containing wafers W is delivered to the carrier table 92 from an external system. The opening 93 is opened, the lid of the carrier C is removed, and the transfer device A1 takes out a wafer W from the carrier C. Then, the wafer W is transferred through the transfer stage TRS of the shelf unit U1 to the main carrying device A2. The main carrying device A2 carries the wafer W to the cooling unit CPL and the adhesion promoting module ADH in that order. The adhesion promoting unit ADH executed the steps S of the foregoing adhesion promoting process to process the wafer W. Then, the main carrying device A2 carries the wafer W to the cooling unit CPL and the coating unit COT in that order. The coating unit COT coats a surface of the wafer with a resist to form a resist film on the surface of the wafer W.

Subsequently, the main carrying device A2 carries the wafer W to the heating unit PAB. Then, the main carrying device A3 carries the wafer from the heating unit PAB to the cooling unit CPL. Then, the transfer device A4 transfers the wafer W from the cooling unit CPL to the buffer module BM. The wafer W is held temporarily in the buffer module BM. Then, the transfer device A4 carries the wafer W from the buffer module BM to the precision temperature regulating module ICPL of the shelf unit U6 and the transfer unit TRS of the shelf unit U6. Then, the transfer device A5 transfers the wafer W from the transfer unit TRS of the shelf unit U6 to the receiving stage 103 of the exposure system B4. The wafer W is subjected to an immersion exposure process in a predetermined place in the exposure system B4. As mentioned in connection with the description of the related art, the adhesion promoting process is effective because the resist film is liable to come off particularly from the beveled part of the wafer W.

The wafer W processed by the immersion exposure process is placed on the deliver stage 104 of the exposure system B4. Then, the wafer W is carried via the transfer device A5, the transfer unit TRS of the shelf unit U6, the transfer device A4, the heating unit PEB of the shelf unit U3, the main carrying device A3, the cooling unit CPL and the main carrying device A3 to the developing unit DEV. The developing unit DEV processes the wafer W by the developing process to form a resist pattern. Then, the wafer W is carried via the main carrying device A3, the heating unit PDB, the main carrying device A2, the cooling unit CPL and the main carrying device A2 to the transfer stage TRS of the shelf unit U1. Then, the transfer device A1 transfers the wafer W from the transfer stage TRS of the shelf unit U1 to the carrier C from which the wafer W was taken out.

Evaluation Tests

The foregoing adhesion promoting device 8 was used for evaluation tests. Heating temperatures for heating a wafer W and processing times used in the foregoing steps S of the adhesion promoting process to promote adhesion more effectively than the conventional adhesion promoting process were verified. In the evaluation tests, a test wafer V was heated by a heater 111 of PI and stainless steel foil instead of by the heater 51. A circular hot plate 112 of 100 mm in diameter was placed on the test heater 111. A test wafer V of 30 mm in diameter was heat through the hot plate 112 by the heater 111. Nitrogen gas ($N_2$) was not supplied to the lower surface of the test wafer V. The respective thicknesses h1, h2 and h3 of the test wafer V, the hot plate 112 and the heater 111 were 725 μm, 725 μm and 100 μm, respectively.

The test wafer V was processed by the prior art adhesion promoting process mentioned in connection with the description of the related art. In steps Q, the test wafer V was heated at 90° C., a time interval between times r1 and r2 in which the mixed gas containing the HMDS gas and $N_2$ was supplied was 30 s and a time interval between times r2 and r3 in which only $N_2$ was supplied was 10 s. The contact angle, namely, an index of a hydrophobic property, of the surface of the test wafer V processed by the adhesion promoting process was 59.7°. A larger contact angle indicates a higher hydrophobic property. A high hydrophobic property is preferable because the higher the hydrophobic property of the surface of a wafer, the higher the adhesion between the surface of the wafer and the resist film. Contact angles of the surfaces of test wafers were measured in evaluation tests 1 to 3. Measured contact angles were compared for verification. The measured amount of the used liquid HMDS was 230 μL.

Evaluation Test 1

The steps S of the adhesion promoting process embodying the present invention were executed to process a plurality of test wafers V. The respective contact angles of the surfaces of the test wafers V thus processed were measured. The test wafers V were heated at different temperatures lower than 90° C., respectively, when the mixed gas containing HMDS gas and $N_2$ is supplied to the test wafers V in step S4. A processing time in step S4, namely, a time interval between the times t1 and t2, was 3 s. In step S5, the test wafers V were heated at 90° C. for 25 s. In step S6, the test wafers V were held at 90° C. for 10 s. In step S6 in evaluation tests 2 and 3, $N_2$ as a purging gas was not supplied to the surfaces of the test wafers V and excessive HMDS molecules were removed only by the agency of thermal energy. In step S4, $N_2$ was supplied into the HMDS storage tank 71 at a flow rate of 4 L/min. The measured amount of the liquid HMDS used for the process was 100 μL.

Figure 12:
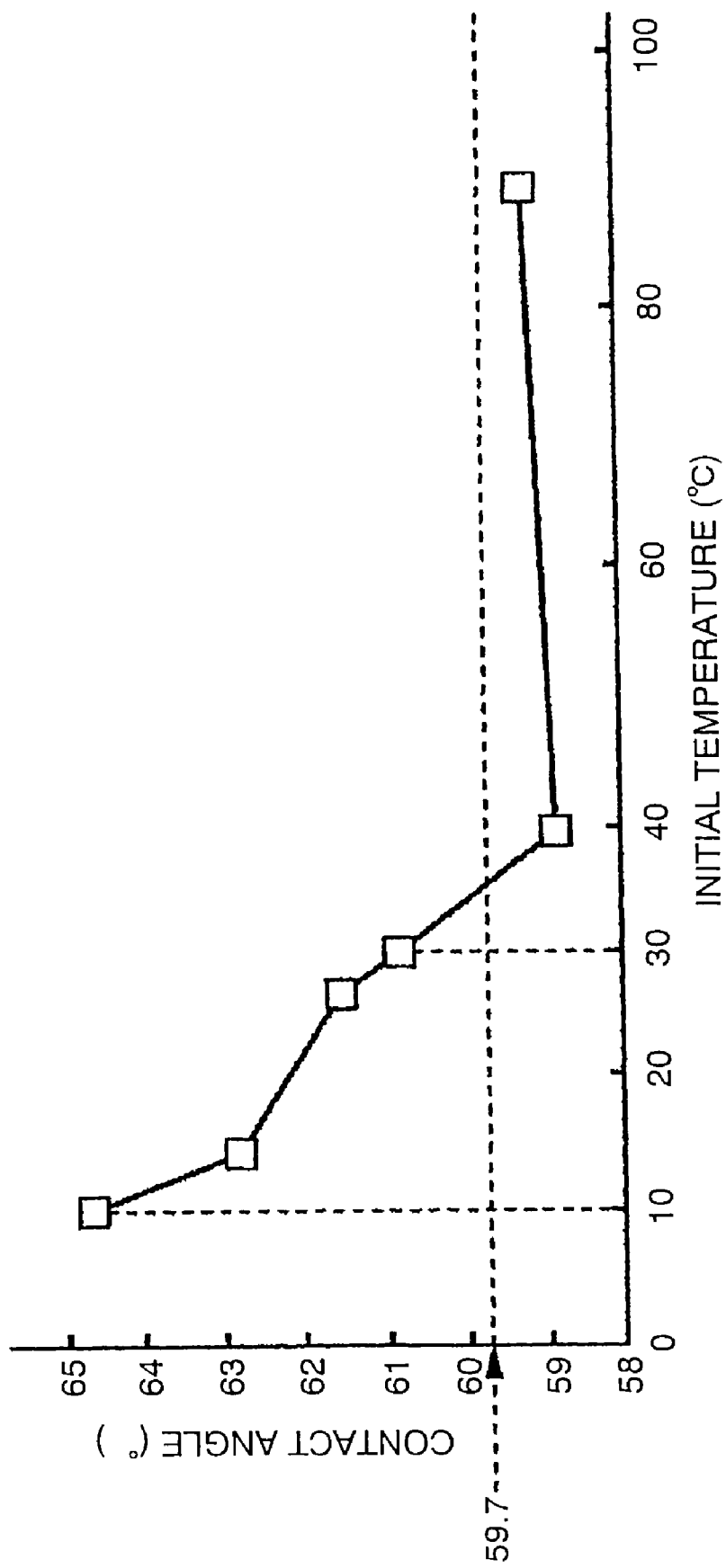
FIG. 12 is a graph showing results of evaluation tests.

FIG. 12 is a graph showing the relation, determined through experiments, between set temperature (initial temperature) used at a stage of making a wafer V adsorb HMDS molecules in step S4 and contact angle of the surface of a wafer V processed by the adhesion promoting process. In FIG. 12, contact angle is measured on the vertical axis and initial temperature is measured on the horizontal axis. As obvious from FIG. 12, the contact angles of the surfaces of the wafers V processed by the adhesion promoting process of the present invention are equal to or smaller than those of the surfaces of wafers processed by the conventional adhesion promoting process. Experiments proved that the adhesion promoting process of the present invention can reduce the necessary amount of the HMDS gas. Contact angles of the surfaces of the wafers V heated at initial temperatures in the range of 10° C. to 30° C. were larger than those of wafers processed by the conventional adhesion promoting process. Experiments proved that the use of initial temperatures in the range of 10° C. to 30° C. is preferable because the hydrophobic property of the wafers V heated at initial temperatures in the range of 10° C. to 30° C. was better than that of the wafers processed by the conventional adhesion promoting process. Although it is expected that the wafer V has a very high hydrophobic property when the initial temperature is below 10° C., the wafer W needs to be heated at a temperature higher than the dew point of the HMDS gas because parts in which the HMDS gas condensed and parts in which the HMDS gas did not condense of the surface of the wafer V have different contact angles, respectively, and the wafer does not have uniform hydrophobic property over the entire surface thereof if the HMDS gas condenses on the surface of the wafer V. The HMDS gas did not condense when the initial temperature was 10° C.

Evaluation Test 2

The same adhesion promoting process as the evaluation test 1 was carried out to process a plurality of test wafers V. Contact angles of the surfaces of the processed test wafers V were measured. In step S4, all the test wafers V were heated at 23° C. The test wafers V were kept at 23° C. after the start of supplying the mixed gas containing the HMDS gas to the test wafers V for different processing times (23° C. holding times), respectively, before the temperatures of the test wafers V were raised. The measured amount of the liquid HMDS used for processing the test wafers V was smaller than 230 μL used by the conventional adhesion promoting process.

Figure 13:
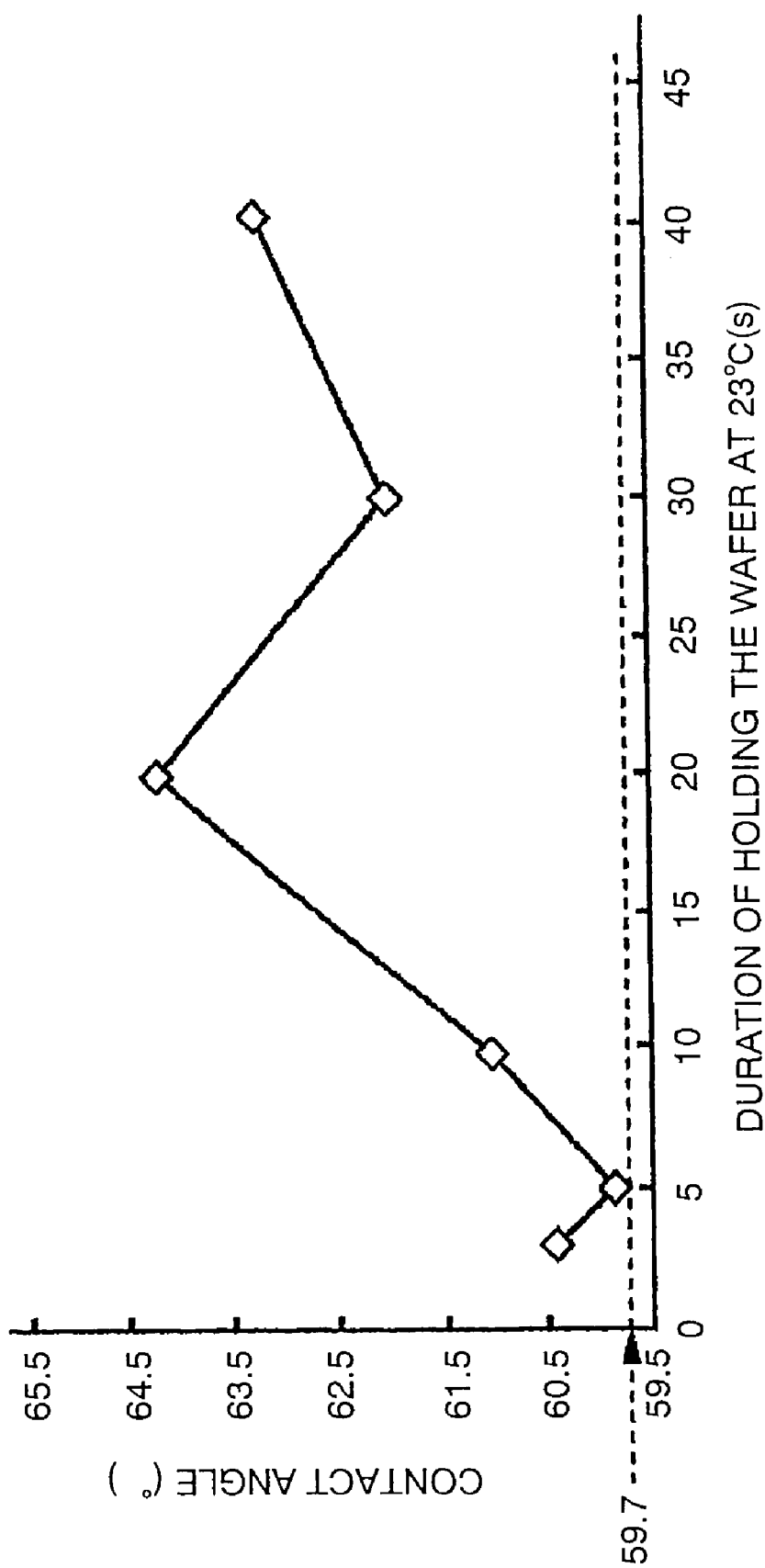
FIG. 13 is a graph showing results of evaluation tests.

FIG. 13 is a graph showing the dependence of contact angle on the duration of holding the wafer at 23° C. In FIG. 13, contact angle is measured on the vertical axis and 23° C. holding time is measured on the horizontal axis. As obvious from FIG. 13, the contact angles of the surfaces of the test wafers V processed by the adhesion promoting process of the present invention were larger than the contact angle of 59.7° of the surface of a test wafer V processed by the conventional adhesion promoting process. The experiment showed that a suitable processing time preceding raising the temperature of the wafer V was not shorter than 3 s which was the shortest processing time in the evaluation test 2.

Evaluation Test 3

The same adhesion promoting process as the evaluation test 1 was carried out to process a plurality of test wafers V. In step S4, all the test wafers V were heated at 26° C. and the processing time (15° C. holding time) was 10 s. In step S5, the test wafers V were heated at different temperatures, respectively, and the test wafers V were held at the different temperatures, respectively, for a predetermined time in step S6. Contact angles of the surfaces of the test wafers V thus processed were measured. The measured amount of the liquid HMDS used for processing the test wafers V was smaller than 230 μL used by the conventional adhesion promoting process.

Figure 14:
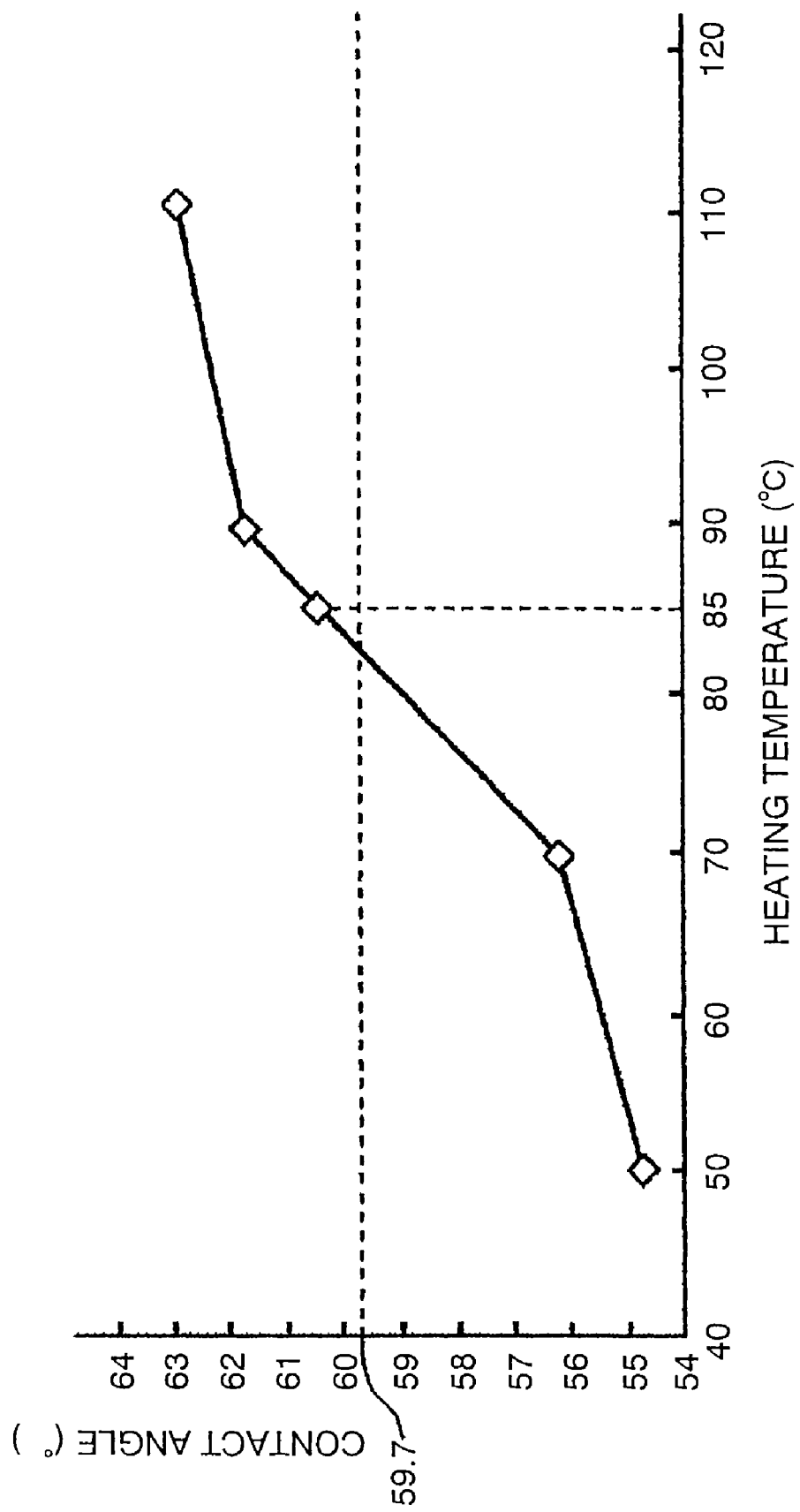
FIG. 14 is a graph showing results of evaluation tests.

FIG. 14 is a graph showing the dependence of contact angle on the heating temperature, in which contact angle of the surface of the test wafer V processed by the adhesion promoting process is measured on the vertical axis and heating temperature is measured on the horizontal axis. As obvious from FIG. 14, the contact angles of the surfaces of the test wafers V processed by the adhesion promoting process of the present invention were larger than the contact angle of 59.7° of the surface of a test wafer V processed by the conventional adhesion promoting process when the heating temperatures were 85° C. or above. The experiment showed that a suitable heating temperature for providing wafers with a satisfactory hydrophobic property was 85° C. or above.

Evaluation Test 4

Figure 15:
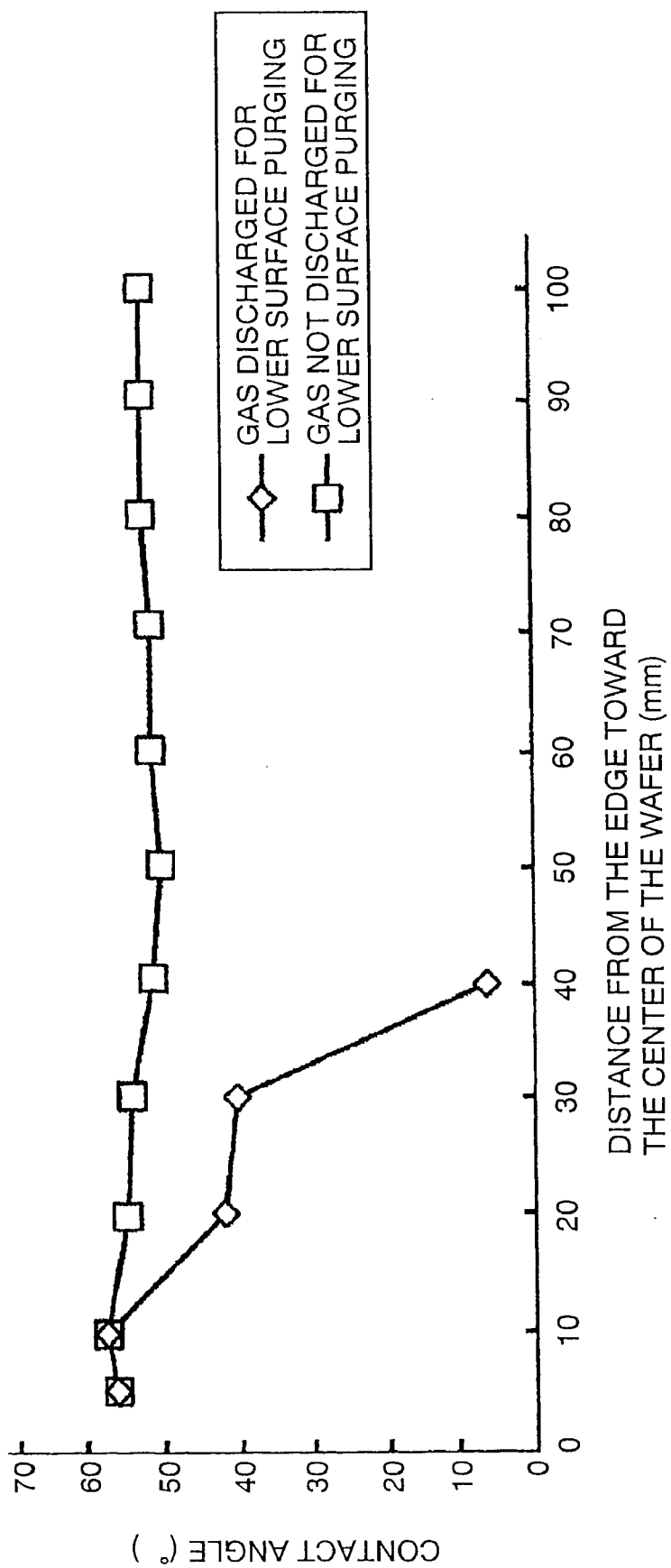
FIG. 15 is a graph showing results of evaluation tests.
Figure 16A:
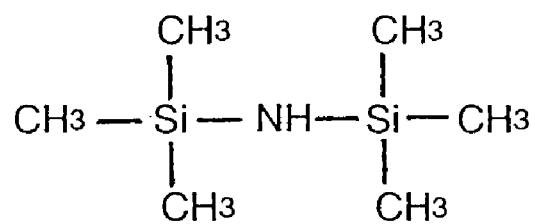
FIGS. 16A and 16B are views of assistance in explaining the interaction of HMDS molecules and hydroxyl groups on a surface of a wafer.
Figure 16A:
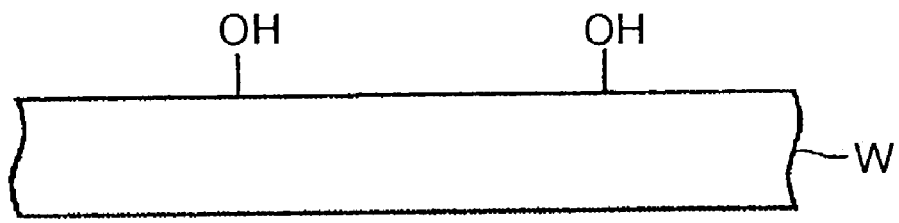
Figure 16B:
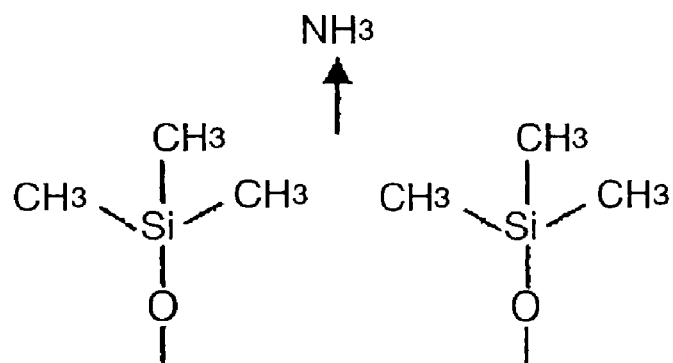
Figure 16B:
Figure 17A:
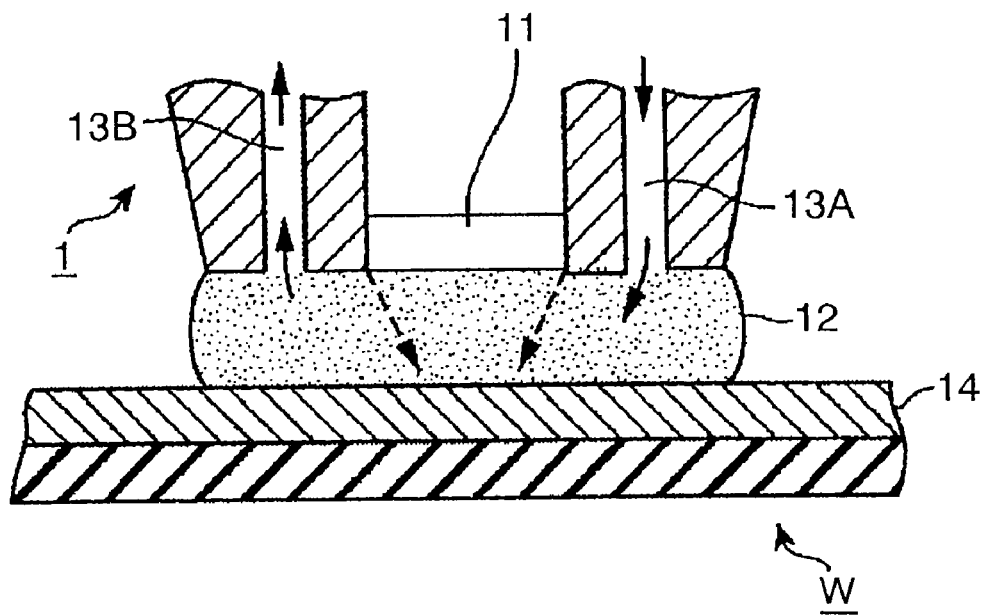
FIGS. 17A and 17B are views of assistance in explaining an immersion exposure process.
Figure 17B:
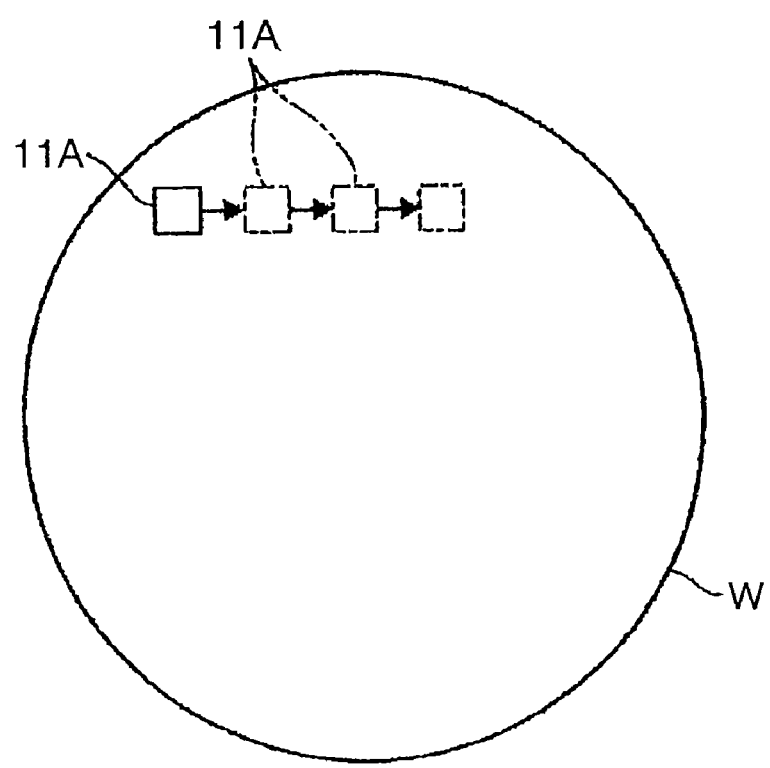
Figure 18:
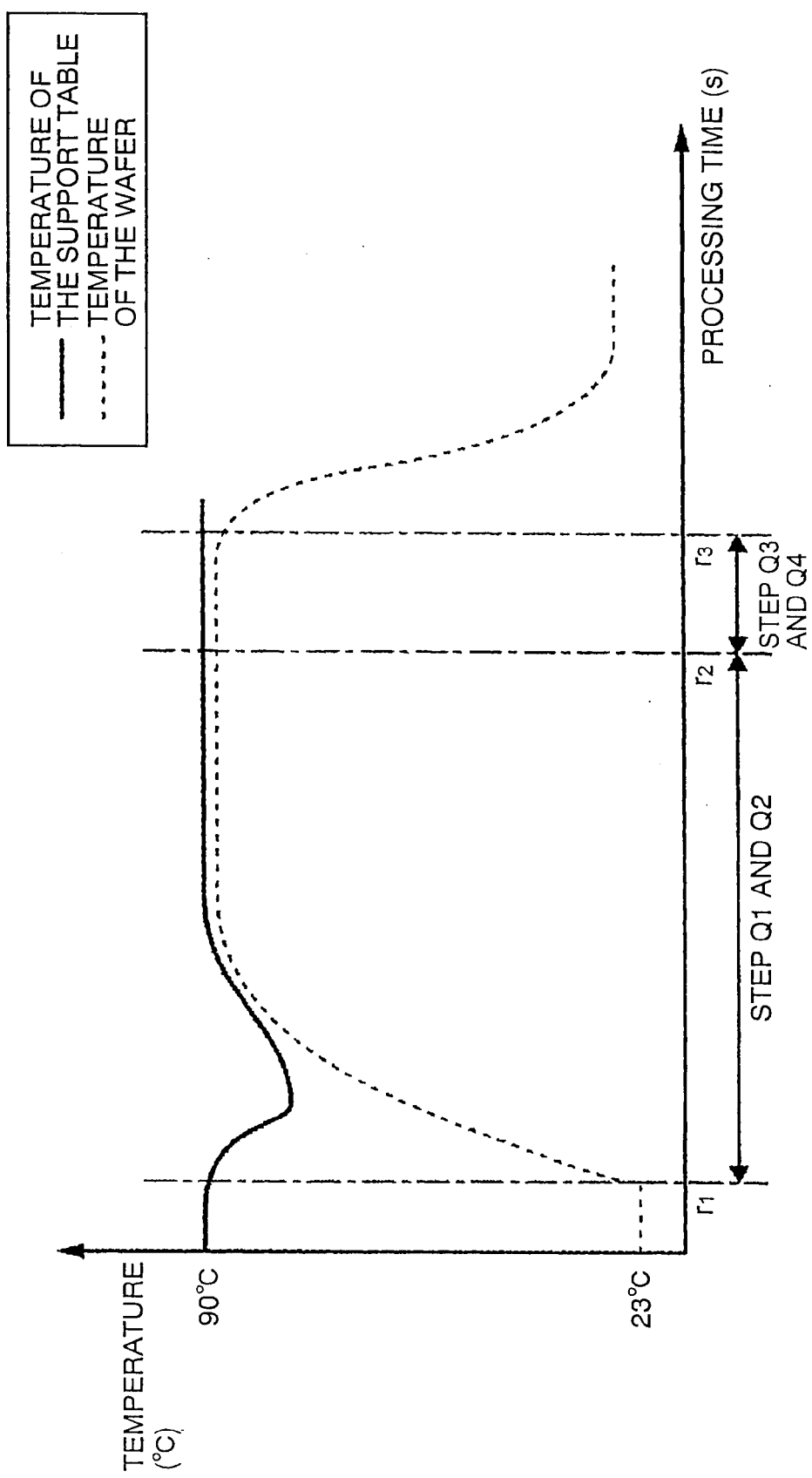
FIG. 18 is a graph showing the variation of the respective temperatures of a support table and a wafer during a conventional adhesion promoting process.
Figure 19A:
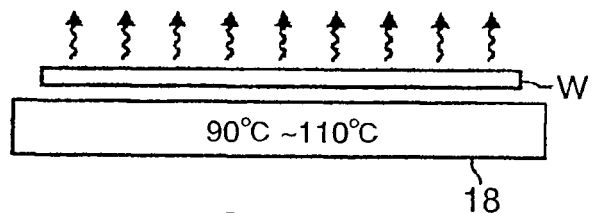
FIGS. 19A, 19B, 19C and 19D are views of assistance in explaining the condition of molecules on a surface of a wafer during the conventional adhesion promoting process.
Figure 19B:
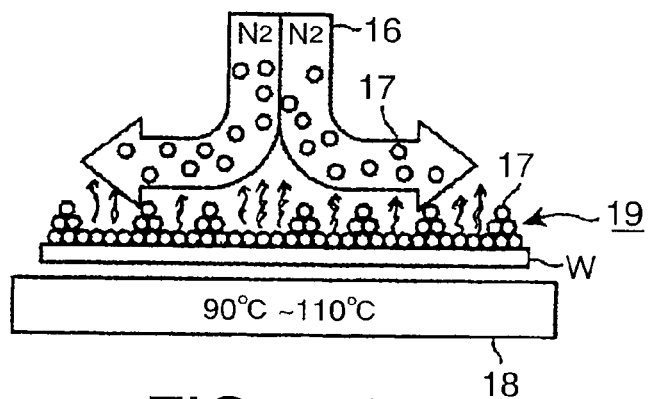
Figure 19C:
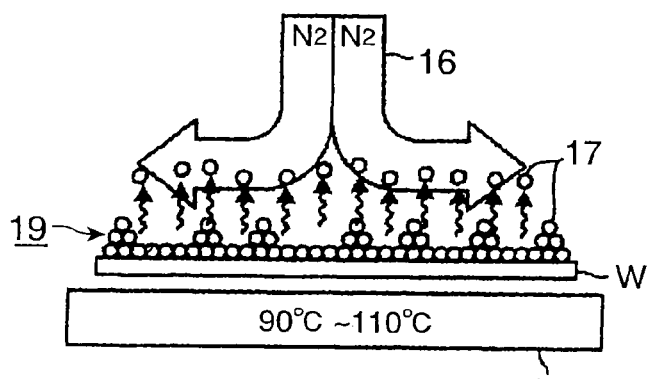
Figure 19D:
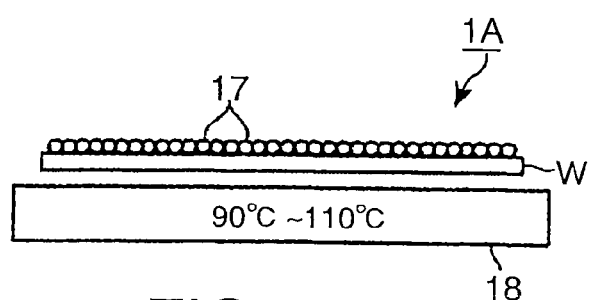

The adhesion promoting process embodying the present invention was carried out to process a plurality of wafers W. Gas was not discharged through the gas discharge openings 53 for some of the wafers W in step S4. Contact angles of the lower surfaces of the thus processed wafers W were measured. FIG. 15 shows the variation of the respective measured contact angles of the lower surfaces of the wafer W against which $N_2$ was discharged for purging and the lower surfaces of the wafer W against which $N_2$ was not discharged for purging with distance from the edge toward the center of the wafer W. It is obvious from FIG. 15 that the respective contact angles of parts of the lower surface of the wafer W for which the purging gas was used nearer to the center of the wafer W are smaller. The measured contact angles proved that purging the lower surface of the wafer W is effective in suppressing the flow of the HMDS gas to the lower surface of the wafer W.

What is claimed is:

1. An adhesion promoting process comprising the steps of:
placing a workpiece horizontally on a support table disposed in a processing space defined by a processing vessel;
adjusting the temperature of the workpiece placed on the support table to a first temperature at which an adhesion promoting gas does not condense on the workpiece in dew drops, the first temperature being 30° C. or below and being low enough for suppressing a production of ascending air currents rising from the workpiece while the adhesion promoting gas is supplied;
supplying the adhesion promoting gas downward to a surface of the workpiece to flow from a center part of the surface of the workpiece toward to a peripheral part of the surface of the workpiece, the workpiece being adjusted at the first temperature to make the surface of the workpiece hydrophobic through the interaction of molecules contained in the adhesion promoting gas and the surface of the workpiece;
adjusting the temperature of the workpiece to a second temperature, the second temperature being higher than the first temperature and being at a high enough temperature for supplying thermal energy to the molecules contained in the adhesion promoting gas and which are excessively remaining on the surface of the workpiece, and
evacuating the processing space to remove the molecules which are excessively remaining on the surface of the workpiece and which are provided with the thermal energy.

2. The adhesion promoting process according to claim 1, wherein the adhesion promoting gas is hexamethyldisilazane gas.

3. The adhesion promoting process according to claim 2, wherein the first temperature is 10° C. or above.

4. The adhesion promoting process according to claim 1, wherein the adhesion promoting gas is hexamethyldisilazine gas and the second temperature is 85° C. or above.

5. The adhesion promoting process according to claim 1, wherein the step of removing excessive molecules adjusts the temperature of the workpiece and supplies a surface purging gas to the surface of the workpiece.

6. The adhesion promoting process according to claim 1, wherein the step of supplying the adhesion promoting gas to the workpiece supplies the adhesion promoting gas to the surface of the workpiece and supplies a purging gas to an opposite surface of the workpiece opposite facing to the surface of the workpiece.

* * * * *